US009042576B2

(12) United States Patent
Sugiyama

(10) Patent No.: US 9,042,576 B2
(45) Date of Patent: May 26, 2015

(54) SIGNAL PROCESSING METHOD, INFORMATION PROCESSING APPARATUS, AND STORAGE MEDIUM FOR STORING A SIGNAL PROCESSING PROGRAM

(75) Inventor: Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 414 days.

(21) Appl. No.: 13/508,694

(22) PCT Filed: Nov. 2, 2010

(86) PCT No.: PCT/JP2010/069870
§ 371 (c)(1), (2), (4) Date: May 8, 2012

(87) PCT Pub. No.: WO2011/055830
PCT Pub. Date: May 12, 2011

(65) Prior Publication Data

US 2012/0224718 A1 Sep. 6, 2012

(30) Foreign Application Priority Data

Nov. 9, 2009 (JP) ................................ 2009-256596

(51) Int. Cl.
*H04B 15/00* (2006.01)
*G10L 21/0208* (2013.01)
*G10L 21/0232* (2013.01)

(52) U.S. Cl.
CPC ......... *G10L 21/0208* (2013.01); *G10L 21/0232* (2013.01)

(58) Field of Classification Search
CPC ............. H04R 3/005; H04R 2410/007; G10L 21/208; G10L 2021/02165
USPC ........................................................ 381/94.1
See application file for complete search history.

(56) References Cited

U.S. PATENT DOCUMENTS

| | | | | |
|---|---|---|---|---|
| 5,757,937 | A * | 5/1998 | Itoh et al. | 381/94.3 |
| 6,668,062 | B1 * | 12/2003 | Luo et al. | 381/122 |
| 7,031,478 | B2 * | 4/2006 | Belt et al. | 381/92 |
| 7,881,480 | B2 * | 2/2011 | Buck et al. | 381/94.1 |
| 2007/0058828 | A1 * | 3/2007 | Fujii et al. | 381/317 |

FOREIGN PATENT DOCUMENTS

| | | | |
|---|---|---|---|
| CN | 1430778 | A | 7/2003 |
| CN | 1677876 | A | 10/2005 |
| CN | 101146080 | A | 3/2008 |
| JP | 7-248783 | A | 9/1995 |
| JP | 8-221092 | A | 8/1996 |
| JP | 2008-99163 | A | 4/2008 |
| JP | 4282227 | B2 | 6/2009 |

OTHER PUBLICATIONS

Communication dated Jan. 24, 2013 from the State Intellectual Property Office of P.R. China in counterpart Chinese application No. 201080050832.4.

* cited by examiner

*Primary Examiner* — Simon Sing
(74) *Attorney, Agent, or Firm* — Sughrue Mion, PLLC

(57) ABSTRACT

To sufficiently suppress an impact sound in a noisy signal. The impact sound in the noisy signal is suppressed. For this, the impact sound is detected in the noisy signal. It is characterized in that phase information of the detected impact sound is processed by using the phase information of a signal other than the impact sound in the noisy signal so that an amount of change in the phase information is reduced.

20 Claims, 17 Drawing Sheets

SIGNAL PROCESSING METHOD, INFORMATION PROCESSING APPARATUS, AND STORAGE MEDIUM FOR STORING A SIGNAL PROCESSING PROGRAM

This application is a National Stage of International Application No. PCT/JP2010/069870, filed on Nov. 2, 2010, which claims priority from Japanese Patent Application No. 2009-256596, filed on Nov. 9, 2009, the contents of all of which are incorporated herein by reference in their entirety.

TECHNICAL FIELD

The present invention relates to a signal processing technique of suppressing noise in a noisy signal to enhance a target signal.

BACKGROUND ART

A noise suppressing technology is known as a signal processing technology of partially or completely suppressing noise in a noisy signal (a signal containing a mixture of noise and a target signal) and outputting an enhanced signal (a signal obtained by enhancing the target signal). For example, a noise suppressor is a system that suppresses noise mixed in a target audio signal. The noise suppressor is used in various audio terminals such as mobile phones.

Concerning technologies of this type, patent literature 1 discloses a method of suppressing noise by multiplying an input signal by a suppression coefficient less than 1. Patent literature 2 discloses a method of suppressing noise by directly subtracting estimated noise from a noisy signal. However, the techniques described in patent literatures 1 and 2 include an averaging operation in noise estimation. Therefore, the noise that occurs in an unexpected fashion such as impact sound cannot be sufficiently suppressed.

In contrast, non-patent literature 1 discloses a noise suppressing system which detects the impact sound based on flatness of a power spectrum of a noisy signal and the increment from the past. A system disclosed in non-patent literature 1 estimates background noise when the impact sound is not detected in a non-voice section. The system disclosed in non-patent literature 1 suppresses the impact sound by replacing the noisy signal with the estimate of the background noise when the impact sound is detected in the non-voice section and updates an impact sound estimate by using a difference between the noisy signal and the background noise. The system disclosed in non-patent literature 1 suppresses the impact sound by subtracting the impact sound estimate from the noisy signal when the impact sound is detected in a voice section.

CITATION LIST

Patent Literature

[patent literature 1] Japanese Patent No. 4282227

[patent literature 2] Japanese Patent Laid-Open No. 8-221092

Non-Patent Literature

[non-patent literature 1] A. Sugiyama, Single-channel impact-noise suppression with no auxiliary information for its detection," Proceedings of WASPAA 2007, pp. 127 to 130, October 2007.

SUMMARY OF INVENTION

However, in an arrangement disclosed in the above-mentioned non-patent literature 1, an impact sound suppression process is not applied to a phase. Therefore, discontinuity of the phase remains. As a result, a case in which a user does not feel that the impact sound is sufficiently suppressed occurs.

By considering the above-mentioned problem, an object of the present invention is to provide a signal processing technology which can solve the above-mentioned problem.

In order to achieve the above-mentioned object, in a signal processing method according to the present invention, in order to suppress an impact sound in a noisy signal, the impact sound is detected in the noisy signal and phase information of the detected impact sound is processed by using phase information of a noisy signal other than the above-mentioned impact sound in the noisy signal so that an amount of change in the phase information is reduced.

In order to achieve the above-mentioned object, an information processing apparatus according to the present invention which suppresses an impact sound in a noisy signal includes detection means for detecting the impact sound in the above-mentioned noisy signal and phase processing means for processing phase information of the detected impact sound by using phase information of a noisy signal other than the impact sound in the noisy signal.

In order to achieve the above-mentioned object, a signal processing program stored in a program recording medium according to the present invention, that is the signal processing program for suppressing an impact sound in a noisy signal, causes a computer to execute a step for detecting the impact sound in the noisy signal and a step for processing phase information of the detected impact sound by using phase information of a noisy signal other than the impact sound in the noisy signal.

Advantageous Effect of Invention

By using the present invention, by applying an impact sound suppressing process to phase information in the noisy signal, signal discontinuity caused by a phase can be reduced and the impact sound can be sufficiently reduced.

EXEMPLARY EMBODIMENTS

Exemplary embodiments will now be described in detail by way of example with reference to the accompanying drawings. Note that the constituent elements described in the exemplary embodiments are merely examples, and the technical scope is not limited by the following exemplary embodiments.

Further, "noise" in this specification means generally unnecessary information other than information that is a processing target and it is not limited to sound. "Impact sound" in this specification is a kind of noise. It means information which rapidly changes in a short time. It is not limited to sound.

First Exemplary Embodiment

<Overall Arrangement>

Figure 1:
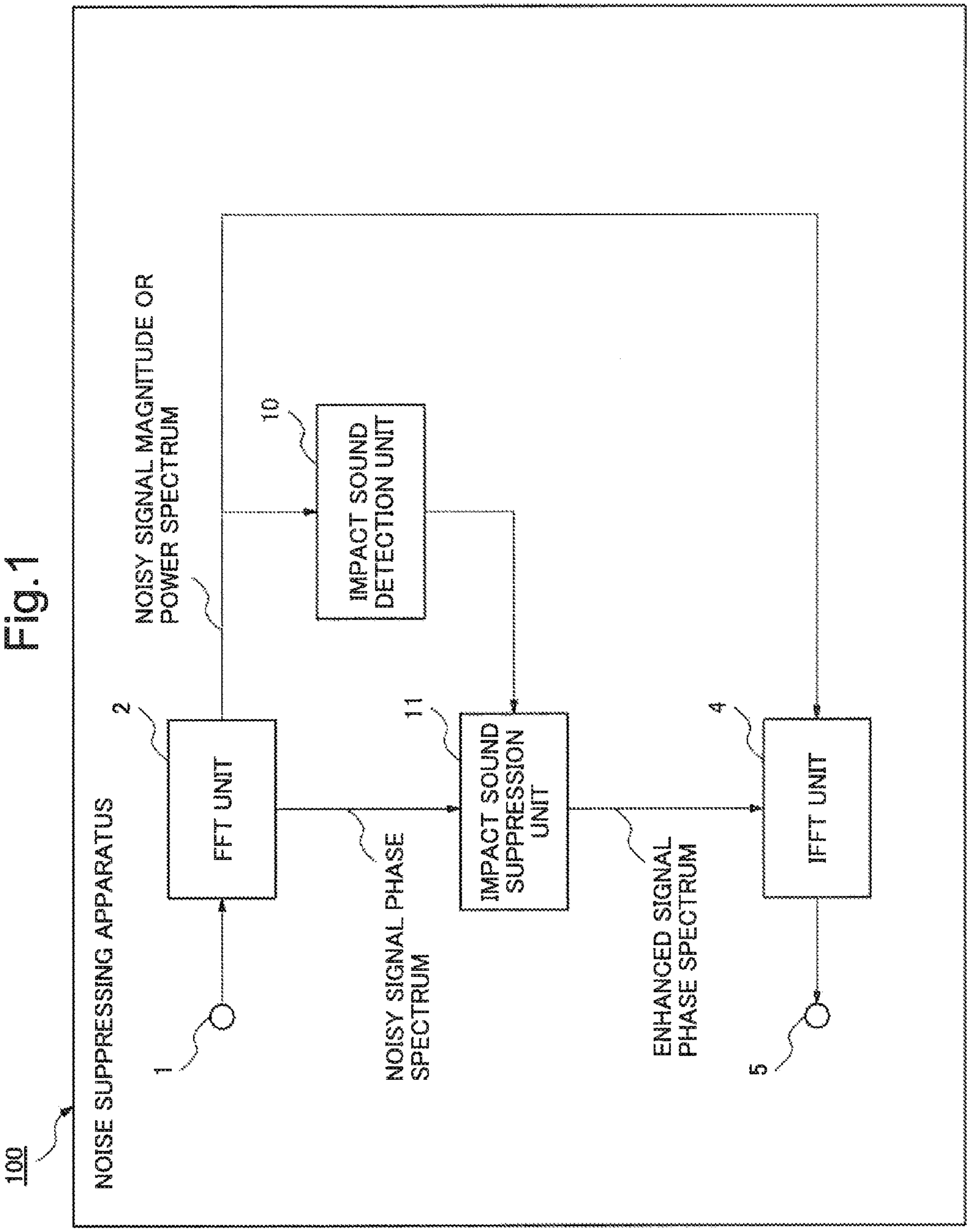
FIG. 1 is a block diagram showing the schematic arrangement of a noise suppressing apparatus 100 according to the first exemplary embodiment of the present invention.
Figure 16:
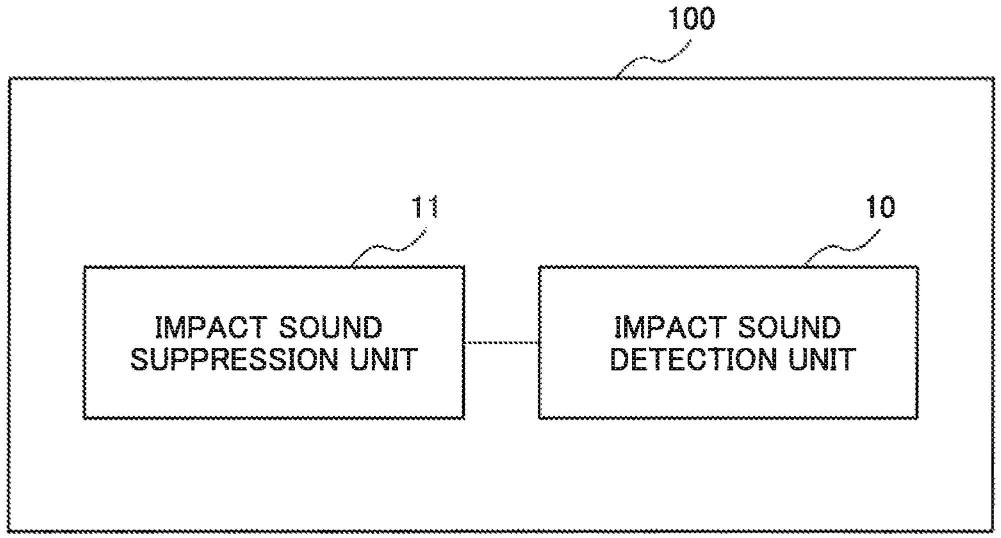
FIG. 16 is a block diagram showing an example of another arrangement of the noise suppressing apparatus 100.

As the first exemplary embodiment for realizing a signal processing method according to the present invention, a noise suppressing apparatus will be explained. FIG. 1 is a block diagram showing the overall arrangement of the noise suppressing apparatus 100. FIG. 16 is a block diagram showing an example of another arrangement of the noise suppressing apparatus 100. The noise suppressing apparatus 100 functions as a part of an apparatus such as for example, a digital camera, a laptop computer, a mobile phone, or the like. However, the use of the present invention is not limited to these apparatuses and can be applied to all information processing apparatuses in which it is required to remove noise from an input signal.

A noisy signal (a signal containing a mixture of a target signal and noise) is supplied to an input terminal 1 as a sample value sequence. The transform such as Fourier transform or the like is applied to the noisy signal supplied to the input terminal 1 in an FFT unit 2 and the noisy signal is divided into a plurality of frequency components. The magnitudes of the plurality of frequency components are multiplexed as a magnitude spectrum and it is transmitted to an impact sound detection unit 10 and an IFFT unit 4. On the other hand, the phase thereof is supplied to an impact sound suppression unit 11 as a phase spectrum.

The impact sound detection unit 10 detects the existence of the impact sound based on a frequency characteristic and a time characteristic of the noisy signal spectrum. The impact sound detection unit 10 may use one of the frequency characteristic and the time characteristic or both of them when detecting it. When both of them are used, the impact sound detection unit 10 can use a weighted sum of the evaluation results of both the characteristics or an integrated result expressed by a more complicated function. The impact sound suppression unit 11 suppresses the impact sound at each frequency based on impact sound detection information supplied by the impact sound detection unit 10 with respect to the noisy signal supplied by the FFT unit 2 and transmits an impact sound suppression result to the IFFT unit 4 as an enhanced signal phase spectrum.

The IFFT unit 4 inversely transforms the combination of the enhanced signal magnitude spectrum supplied from the impact sound suppression unit 11 and the noisy signal phase supplied from the FFT unit 2, and supplies an enhanced signal sample to an output terminal 5.

<Arrangement of FFT Unit 2>

Figure 2:
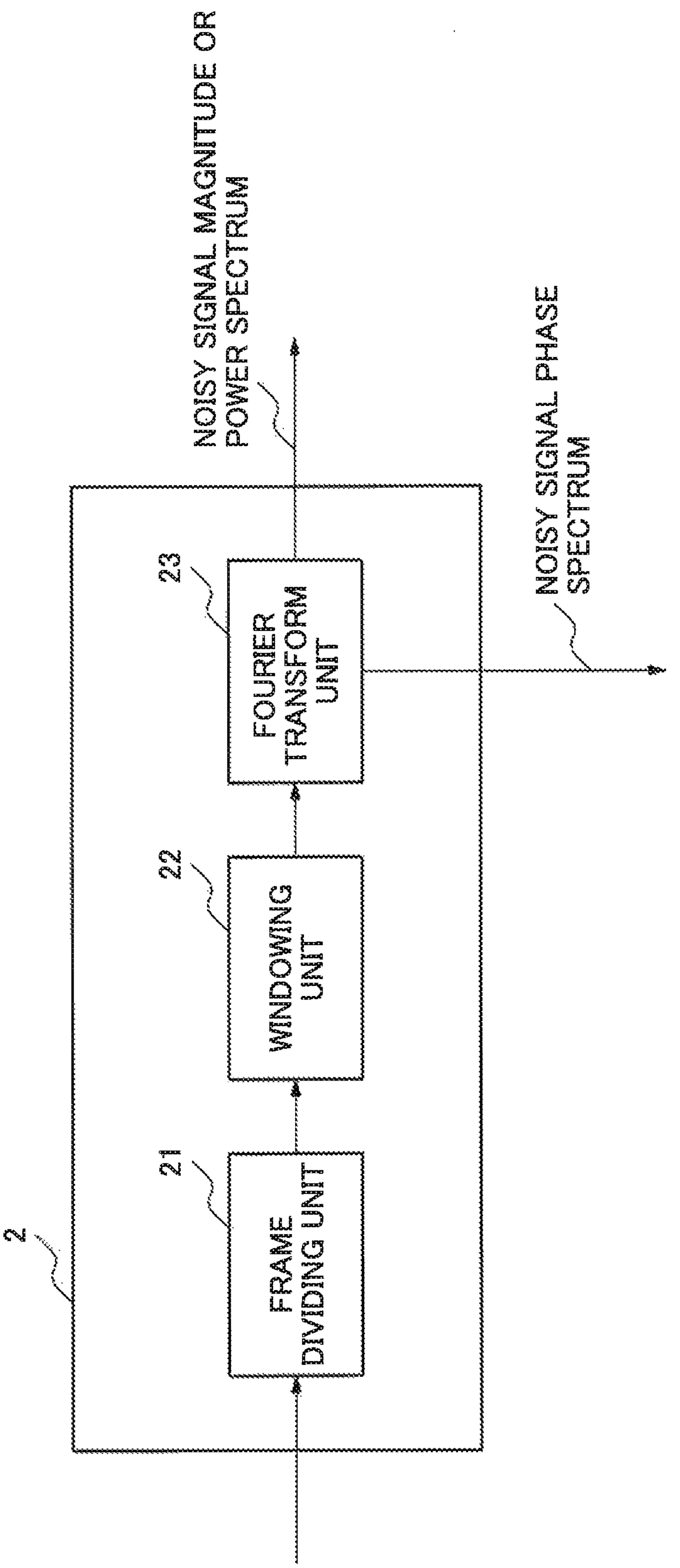
FIG. 2 is a block diagram showing the arrangement of an FFT (Fast Fourier Transform) unit 2 included in the noise suppressing apparatus 100 according to the first exemplary embodiment of the present invention.

FIG. 2 is a block diagram showing the arrangement of the FFT unit 2. As shown in FIG. 2, the FFT unit 2 includes a frame dividing unit 21, a windowing unit 22, and a Fourier transform unit 23. The frame dividing unit 21 receives the noisy signal sample and divides it into frames corresponding to K/2 samples, where K is an even number. The noisy signal sample divided into frames is supplied to the windowing unit 22 and multiplied by a window function w(t). The signal obtained by windowing an nth frame input signal $y_n(t)$ (t=0, 1, . . . , K/2−1) by w(t) is given by $$\bar{y}_n(t)=w(t)y_n(t) \quad (1)$$

Also widely conducted is windowing two successive frames partially overlaid (overlapping) each other. Assume that the overlap length is 50% the frame length. For t=0, 1, . . . , K/2−1, the windowing unit 22 outputs $\bar{y}_n(t)$ and $\bar{y}_n(t+k/2)$ given by $$\left.\begin{aligned}\bar{y}_n(t) &= w(t)y_{n-1}(t+K/2)\\ \bar{y}_n(t+K/2) &= w(t+K/2)y_n(t)\end{aligned}\right\} \quad (2)$$

A symmetric window function is used for a real signal. The window function makes the input signal match the output signal except an error when the spectral gain is set to 1 in the MMSE STSA method or zero is subtracted in the SS method. This means w(t)=w(t+K/2)=1.

The example of windowing two successive frames that overlap 50% will continuously be described below. The windowing unit 22 can use, for example, a hanning window w(t) given by $$w(t)=\begin{cases}0.5+0.5\cos\left(\dfrac{\pi(t-K/2)}{K/2}\right), & 0\le t<K\\ 0, & \text{otherwise}\end{cases}\qquad(3)$$

Alternatively, the windowing unit 22 may use various window functions such as a hamming window, a Kaiser window, and a Blackman window. The windowed output is supplied to the Fourier transform unit 23 and transformed into a noisy signal spectrum $Y_n(k)$. The noisy signal spectrum $Y_n(k)$ is separated into the phase and the magnitude. A noisy signal phase spectrum $\arg Y_n(k)$ is supplied to the impact sound suppression unit 11, whereas a noisy signal magnitude spectrum $|Y_n(k)|$ is supplied to the impact sound detection unit 10 and the IFFT unit 4. As already described, the FFT unit 2 can use the power spectrum instead of the magnitude spectrum.

<Arrangement of IFFT Unit 4>

Figure 3:
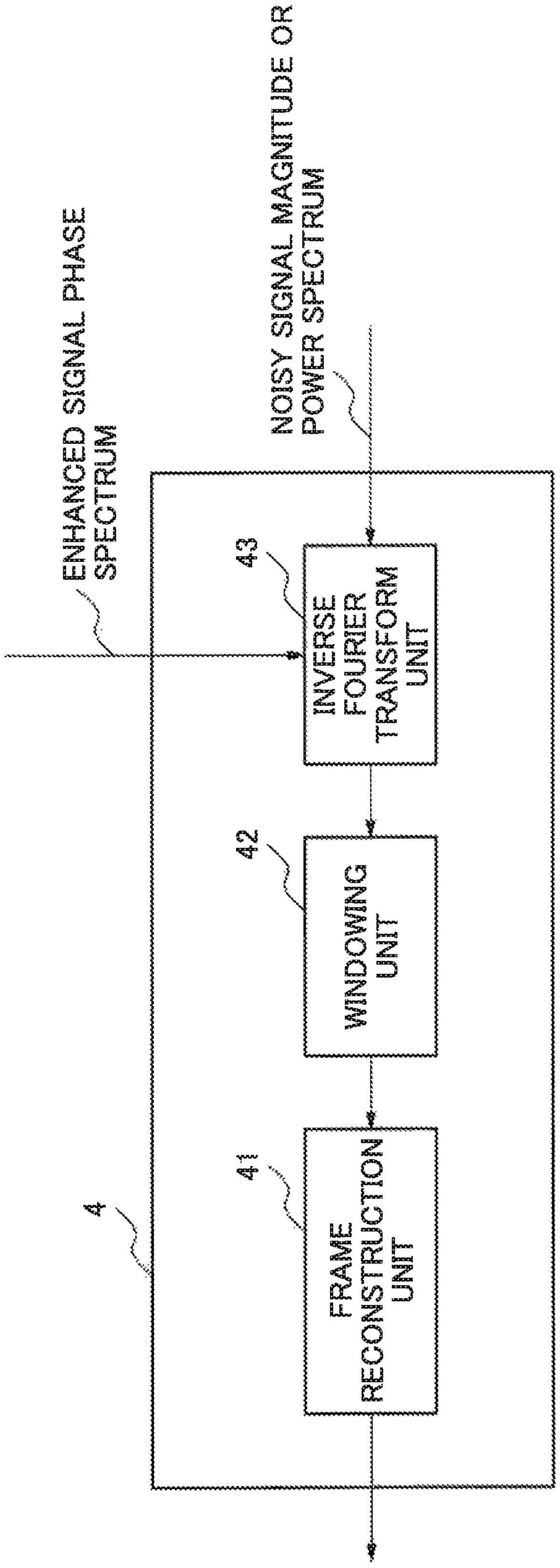
FIG. 3 is a block diagram showing the arrangement of an IFFT (Inverse Fast Fourier Transform) unit 4 included in the noise suppressing apparatus 100 according to the first exemplary embodiment of the present invention.

FIG. 3 is a block diagram showing the arrangement of the IFFT unit 4. As shown in FIG. 3, the IFFT unit 4 includes an inverse Fourier transform unit 43, a windowing unit 42, and a frame reconstruction unit 41. The inverse Fourier transform unit 43 combines the enhanced signal phase spectrum supplied from the impact sound suppression unit 11 with the noisy signal magnitude spectrum $\arg Y_n(k)$ supplied from the FFT unit 2 to obtain an, enhanced signal (Left-hand side of the following equation(4)) given by $$\bar{X}_n(k)=|Y_n(k)|\cdot\arg\bar{X}_n(k)\qquad(4)$$

The inverse Fourier transform unit 43 inversely Fourier-transforms the resultant enhanced signal. The inversely Fourier-transformed enhanced signal is supplied to the windowing unit 42 as a series of time domain samples $x_n(t)$ (t=0, 1, . . . , K−1) in which one frame includes K samples and multiplied by the window function w(t). The signal obtained by windowing an nth frame input signal $x_n(t)$ (t=0, 1, . . . , K/2−1) by w(t) is given by $$\bar{x}_n(t)=w(t)x_n(t)\qquad(5)$$

Also widely conducted is windowing two successive frames partially overlaid (overlapping) each other. Assume that the overlap length is 50% the frame length. For t=0, 1, . . . , K/2−1, the windowing unit 42 outputs $\bar{x}_n(t)$ and $\bar{x}_n(t+k/2)$ given by $$\left.\begin{aligned}\bar{x}_n(t)&=w(t)x_{n-1}(t+K/2)\\ \bar{x}_n(t+K/2)&=w(t+K/2)x_n(t)\end{aligned}\right\}\qquad(6)$$

and provides the frame reconstruction unit 41 with them.

The frame reconstruction unit 41 extracts the output of two adjacent frames from the windowing unit 42 for every K/2 samples, overlays them, and obtains an output signal $\hat{x}_n(t)$ given by $$\hat{x}_n(t)=\bar{x}_{n-1}(t+K/2)+\bar{x}_n(t)\qquad(7)$$

for t=0, 1, . . . , K−1. The frame reconstruction unit 41 provides the output terminal 5 with the resultant output signal.

Note that the transform in the FFT unit 2 and the IFFT unit 4 in FIGS. 2 and 3 has been described above as Fourier transform. However, the FFT unit 2 and the IFFT unit 4 can use any other transform such as cosine transform, modified discrete cosine transform (MDCT), Hadamard transform, Haar transform, or Wavelet transform in place of the Fourier transform. For example, cosine transform or modified cosine transform obtains only a magnitude as a transform result. This obviates the necessity for the path from the FFT unit 2 to the IFFT unit 4 in FIG. 1. In addition, the noise information recorded in the noise information memory 6 needs to include only magnitudes (or powers), contributing to reduction of the memory size and the number of computations of a noise suppressing process. Haar transform allows to omit multiplication and reduce the area of an LSI chip. Since Wavelet transform can change the time resolution depending on the frequency, better noise suppression is expected.

Alternatively, after the FFT unit 2 has integrated a plurality of frequency components, the impact sound suppression unit 11 may perform actual suppression. In this case, the FFT unit 2 can achieve high sound quality by integrating more frequency components from the low frequency range where the discrimination capability of hearing characteristics is high to the high frequency range with a poorer capability. When noise suppression is executed after integrating a plurality of frequency components, the number of frequency components to which noise suppression is applied decreases. The noise suppressing apparatus 100 can thus decrease the whole number of computations.

<Arrangement of Impact Sound Suppression Unit 11>

Figure 4:
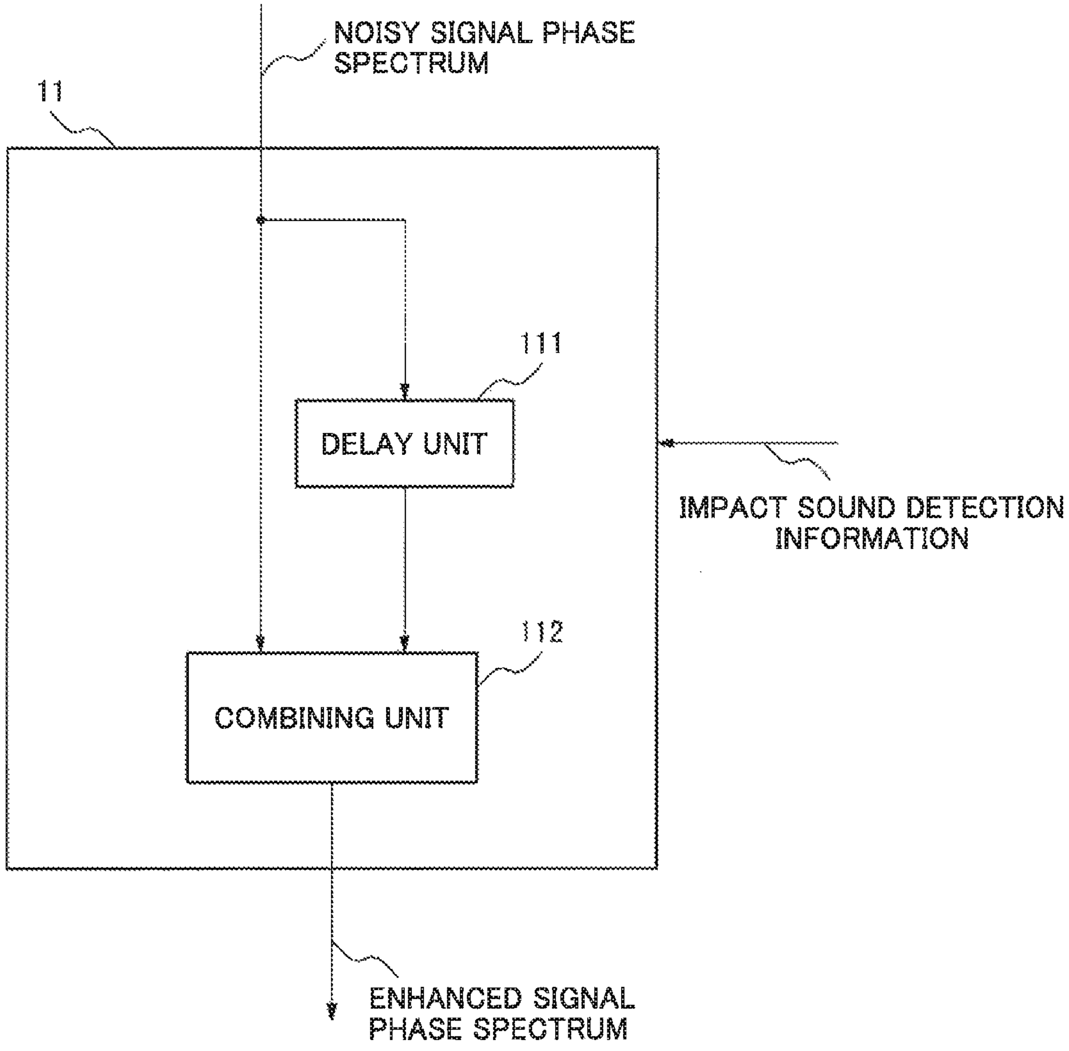
FIG. 4 is a block diagram showing the arrangement of an impact sound suppression unit 11 included in the noise suppressing apparatus 100 according to the first exemplary embodiment of the present invention.

FIG. 4 is a block diagram showing the internal arrangement of the impact sound suppression unit 11. As shown in FIG. 4, the impact sound suppression unit 11 includes a delay unit 111 and a combining unit 112. The delay unit 111 delays the noisy signal phase spectrum that is an input. A plurality of delay amounts can be used. The delay unit 111 can generate a plurality of delayed signals by delaying the input by using a plurality of delay amounts. The combining unit 112 combines the noisy signal phase spectrum and the delayed noisy signal phase spectrum supplied by the delay unit 111 to generate the enhanced signal phase spectrum.

The combining unit 112 performs a phase process only when the detection of the impact sound is transmitted from the impact sound detection unit 10. The combining unit 112 can apply a process represented by the following equation (8) to the phase by using the value in the past (before the occurrence of the impact sound) as the phase process.

$$\arg\bar{X}_n(k)=\frac{1}{NM}\sum_{l=n}^{n-M+1}\sum_{p=k-N/2}^{k+N/2}c_{lp}\arg Y_l(p)\qquad(8)$$

Where, N is a frequency range, M is a range of the frame number, and $c_{1p}$ is a coefficient to the noisy signal phase spectrum whose frequency is p and whose frame is 1 frame before.

Namely, the combining unit 112 calculates the phase of the enhanced signal by a linear coupling of the noisy signal phase spectrum in a frequency range from k−N/2 to k+N/2 and in a range of frame number from n to n−M+1. The simplest example is an average of the present phase and the past phase of a frame that is one frame before at each frequency. Further, the combining unit 112 may apply (replace) a phase that is the same as the phase of the frame that is one frame before. As a result, because the difference from the past phase becomes small compared to the present phase itself, it becomes hardly perceptible as the impact sound. When this idea is extended, the impact sound suppression unit 11 delays the whole signal, use a phase of a component of a future signal that follows the impact sound like the phase of the component of the past signal, and suppresses the change in phase. Whereby, the impact sound suppression effect can be improved. A very large impact sound suppression effect can be obtained by this phase process. The impact sound suppression effect can be obtained by performing only the phase process without performing power control or magnitude control.

The impact sound suppression unit 11 can add a component unrelated to the past value to the phase. One example of such components is a random phase. Further, the impact sound suppression unit 11 can limit the range of the random phase, for example, the range of the random phase is 45 degrees or less. The impact sound suppression unit 11 can effectively suppress the impact sound by adding the component unrelated to the past value to the phase.

As described above, in this exemplary embodiment, the noise suppressing apparatus 100 detects the impact sound in the noisy signal when suppressing the impact sound in the noisy signal and processes the phase component of the detected impact sound by using the phase component of the noisy signal other than the impact sound in the noisy signal. As a result, the noise suppressing apparatus 100 can more effectively suppress the impact sound.

Second Exemplary Embodiment

Next, the second exemplary embodiment of the present invention will be described with reference to FIG. 5. This exemplary embodiment relates to an impact sound suppressing apparatus and a method in which a characteristic impact sound detection method is used. Sufficient detection accuracy cannot be obtained by the conventional impact sound detection method. However, when the impact sound is detected by the method according to this exemplary embodiment, the impact sound in the noisy signal can be detected with very high accuracy.

The impact sound detection unit 10 in this exemplary embodiment detects the existence of the impact sound based on a frequency characteristic and a time characteristic of the noisy signal magnitude spectrum. The impact sound detection unit 10 may use one of the frequency characteristic and the time characteristic or both of them when performing the detection. When the impact sound detection unit 10 uses both the characteristics, it can use a weighted sum of the evaluation results of both the characteristics or an integrated result expressed by a more complicated function.

<Arrangement of Impact Sound Detection Unit>

Figure 5:
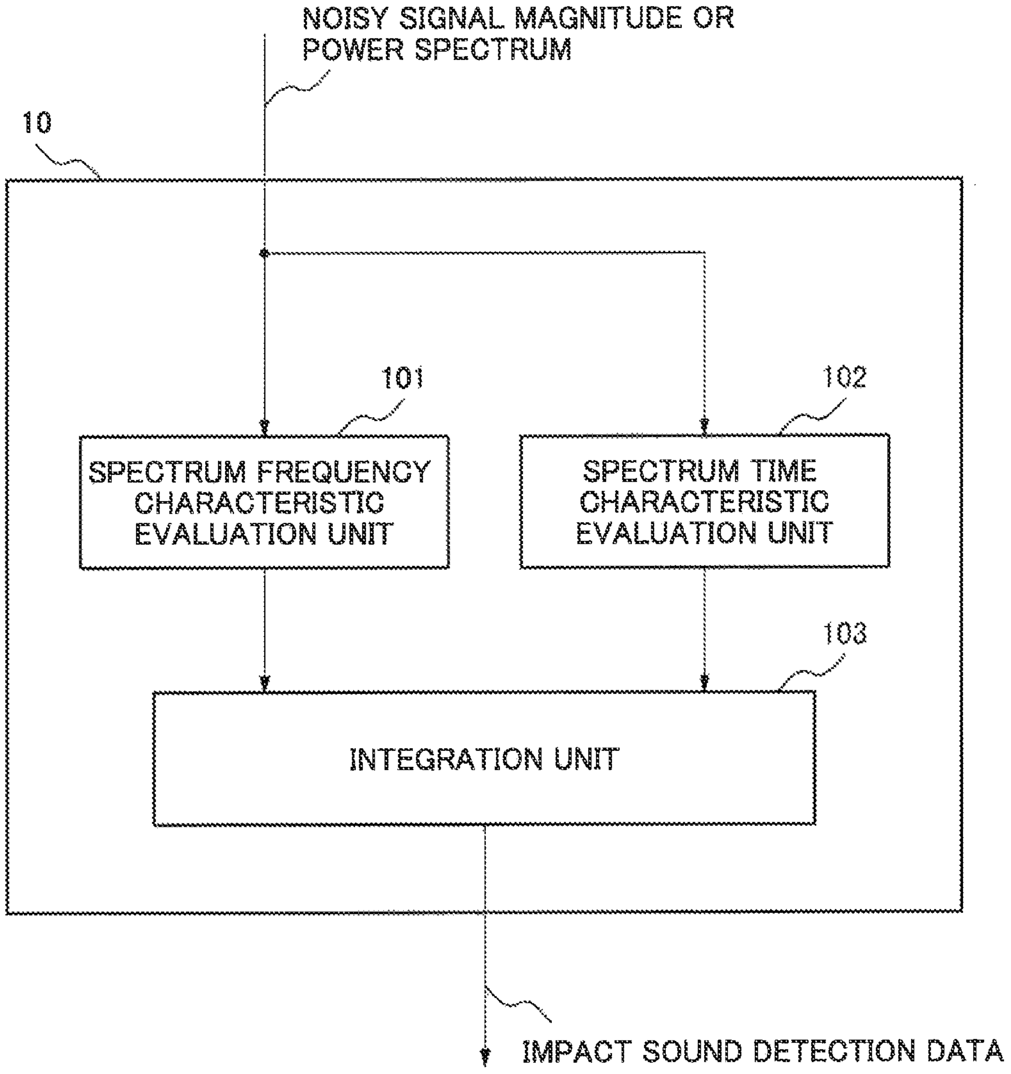
FIG. 5 is a block diagram showing the arrangement of an impact sound detection unit 10 included in the noise suppressing apparatus 100 according to the second exemplary embodiment of the present invention.

FIG. 5 is a block diagram showing the arrangement of the impact sound detection unit 10. By referring to FIG. 5, the impact sound detection unit 10 includes a spectrum frequency characteristic evaluation unit 101, a spectrum time characteristic evaluation unit 102, and an integration unit 103.

The spectrum frequency characteristic evaluation unit 101 evaluates the characteristic with respect to a frequency direction change of the spectrum and supplies it to the integration unit 103. The spectrum frequency characteristic evaluation unit 101 evaluates a flatness degree of the spectrum in a frequency direction as a characteristic with respect to the frequency direction change of the spectrum. The spectrum frequency characteristic evaluation unit 101 can use a total of differential absolute values of the spectrum at adjacent frequency points as the degree of spectral flatness. By using the noisy signal magnitude spectrum $|Y_n(k)|$ in the frame n at a frequency k, the spectrum frequency characteristic evaluation unit 101 can calculate the degree of spectral flatness $F_{mf}(n)$ in the frame n by using the following equation (9).

$$F_{mf}(n) = \sum_{k=1}^{N-1} \big||Y_n(k)| - |Y_n(k-1)|\big| \tag{9}$$

The spectrum frequency characteristic evaluation unit 101 can use the total of the differential absolute values with the average spectrum as the degree of the spectral flatness. By using the mean of an average noisy signal magnitude spectrum $\overline{|Y_n|}$ in the frame n, the spectrum frequency characteristic evaluation unit 101 can calculate the degree of spectral flatness $F_{mf}(n)$ in the frame n by using the following equation (10).

$$F_{mf}(n) = \sum_{k=0}^{N-1} \big|\overline{|Y_n|} - |Y_n(k)|\big| \tag{10}$$

The spectrum frequency characteristic evaluation unit 101 can limit a frequency range within which the flatness degree calculation is performed by k. In particular, because the impact sound spectrum is strong at a high frequency region and the spectrum of a conventional signal is strong at a low frequency region, when the spectrum frequency characteristic evaluation unit 101 limits the range of k to the high frequency region, high detection accuracy can be achieved. The spectrum frequency characteristic evaluation unit 101 may obtain the flatness degree for each subband and obtain an overall degree of flatness by linear or nonlinear coupling of these flatness degrees. The spectrum frequency characteristic evaluation unit 101 can utilize a subband process for discrimination of the impact sound from a frictional sound. Both the impact sound and the frictional sound have a flat spectrum characteristic over a wide range but generally, the bandwidth of the frictional sound is narrower than that of the impact sound and the power of the frictional sound is lower than that of the impact sound at the low frequency region. In order to discriminate the difference between such characteristics, it is effective to couple the subband process with a plurality of subband flatness degrees.

The spectrum frequency characteristic evaluation unit 101 compares the such obtained flatness degree with a threshold value and calculates a score of the flatness degree. The score of the flatness degree is an index representing the flatness. For example, it can be represented as a value normalized between 0 and 1. The spectrum frequency characteristic evaluation unit 101 can determine the score $S_f(n)$ of the flatness degree by using equation (11). Where, $\sigma_H$ is an upper limit threshold value of the flatness degree, $\sigma_L$ is a lower limit threshold value thereof, and FH and FL are the flatness degrees corresponding to these threshold values $\sigma_H$ and $\sigma_L$, respectively.

$$S_f(n) = \begin{cases} 1 & F_{mf}(n) > \sigma_H \\ \dfrac{F_H - F_L}{\sigma_H - \sigma_L} F_{mf}(n) + \dfrac{\sigma_H F_L - \sigma_L F_H}{\sigma_H - \sigma_L} & \sigma_H \geq F_{mf}(n) \geq \sigma_L \\ 0 & F_{mf}(n) < \sigma_L \end{cases} \tag{11}$$

In equation (11), a linear interpolation is used between the upper limit threshold value and the lower limit threshold value but the interpolation in which an arbitrary function, a polynomial equation, or the like is used can be applied.

For example, a past average value or a past central value of the flatness degree, a value calculated based on theses values, or the like can be used in addition to a value determined as the threshold value in advance. The plurality of threshold values are provided in advance and the spectrum frequency characteristic evaluation unit 101 may selectively use them based on a result of the analysis of the noisy signal spectrum. The noisy signal magnitude spectrum, the power spectrum, the statistic amount of these spectrums (the average value, the central value, the maximum value, the minimum value, and variance), or the like is an example of the result of the analysis.

On the other hand, the spectrum time characteristic evaluation unit 102 evaluates the characteristic with respect to a time direction change of the spectrum and supplies it to the integration unit 103. The spectrum time characteristic evaluation unit 102 can use an increment of the magnitude or the power spectrum as the time direction change of the spectrum. The spectrum time characteristic evaluation unit 102 evaluates the time direction change at each frequency point. The spectrum time characteristic evaluation unit 102 may obtain an overall change by linear or nonlinear coupling of these evaluation results. The spectrum time characteristic evaluation unit 102 can obtain the time direction change in the subband. For example, the spectrum time characteristic evaluation unit 102 can obtain the time direction change $F_{mt}$(n) in one subband by the following equation (12).

$$F_{mt}(n) = \sum_{k=1}^{N-1} \{|Y_n(k)| - |Y_{n-1}(k)|\} \quad (12)$$

The lower limit of the subband is determined by the value of k. The spectrum time characteristic evaluation unit 102 can designate the upper limit of the subband by using a specific frequency number instead of N−1. The spectrum time characteristic evaluation unit 102 may obtain the time direction change for each subband and obtain an overall time direction change by linear or nonlinear coupling of these time direction changes. Because the impact sound spectrum is strong at the high frequency region and the spectrum of the conventional signal is strong at the low frequency region, the spectrum time characteristic evaluation unit 102 evaluates the change at only the high frequency region and whereby, the high detection accuracy can be achieved.

The spectrum time characteristic evaluation unit 102 can use the statistic amount (average value, central value, maximum value, minimum value, or variance) of these magnitudes or power spectrums in the frequency direction or combinations of these values. For example, when the spectrum time characteristic evaluation unit 102 uses the minimum value, it can calculate the time change by using the following equation (13).

$$F_{mt}(n) = \min\{|Y_n(k)|\} - \min\{|Y_{n-1}(k)|\} \quad (13)$$

When the spectrum time characteristic evaluation unit 102 uses the time change of such minimum value, the impact sound detection unit 10 can detect the impact sound very accurately. This is because usually, the statistic amount of the noisy signal in the frequency direction can take a wide range of values but with respect to the impact sound, there is a tendency in which the minimum value in the frequency direction is large.

In particular, when any one of these statistic amounts has a small variance, the spectrum time characteristic evaluation unit 102 can achieve high detection accuracy by using the statistic amount with small variance.

Further, for the equations (9) to (12), the power spectrum $|Y_n(k)|^2$ can be used instead of the noisy signal magnitude spectrum $|Y_n(k)|$.

The spectrum time characteristic evaluation unit 102 compares the such obtained time change with a threshold value and obtains the score of the time change. The score of the time change is an index representing a degree of the existence of the time change. For example, it can be expressed as a value normalized between 0 and 1. The spectrum time characteristic evaluation unit 102 can determine the score $S_t$(n) of the time change by using an upper limit threshold value of the time change, a lower limit threshold value thereof, and a time change amount corresponding to these values, like the equation (11). The spectrum time characteristic evaluation unit 102 can apply the interpolation in which an arbitrary function, a polynomial equation, or the like is used instead of the linear interpolation as well as the score of the flatness degree.

The spectrum time characteristic evaluation unit 102 may use a past average value or a past central value of the time change, a value calculated based on theses values, or the like in addition to a value determined as the threshold value in advance. The plurality of threshold values are provided in advance and the spectrum time characteristic evaluation unit 102 may selectively use them based on a result of the analysis of the noisy signal magnitude spectrum. The noisy signal magnitude spectrum, the power spectrum, the statistic amount of these spectrums (the average value, the central value, the maximum value, the minimum value, and variance), or the like is an example of the result of the analysis.

The integration unit 103 integrates the characteristic with respect to the frequency direction change of the spectrum that is supplied by the spectrum frequency characteristic evaluation unit 101 and the characteristic with respect to the time direction change of the spectrum that is supplied by the spectrum time characteristic evaluation unit 102, generates the impact sound data, and outputs it. The impact sound data indicates for example, a degree of similarity to the impact sound that is normalized between 0 and 1. For example, when the impact sound data is "1", it means that it is determined as the impact sound with assurance of 100% and when the impact sound data is "0.8", it means that it is determined as the impact sound with uncertainty of 20%.

The simplest method for integrating the characteristics is to obtain a logical product of the score of the flatness degree and the score of the time change. When both scores are "1", the integration unit 103 sets the impact sound data to "1". The integration unit 103 can use a logical sum instead of the logical product. When one of both scores is "1", the integration unit 103 sets the impact sound data to "1".

The integration unit 103 can calculate the impact sound data by using an integrated score in which these scores are integrated. For example, when the sum of these scores is used as the impact sound data, the integration unit 103 can set the impact sound to "1" or more even when it is uncertain compared to the logical product or the logical sum. The integration of the scores can be achieved by not only a simple addition of both scores but also various integration methods that include a linear function or a nonlinear function. The degree of emphasis of the frequency characteristic or the degree of emphasis of the time characteristic can be adjusted by the function used for this integration.

When the impact sound data obtained by such method is "1" or more, the noise suppressing apparatus determines that the impact sound certainly exists and completely suppresses the impact sound. When the impact sound data is less than "1", the noise suppressing apparatus decreases the degree of the impact sound suppression according to the value.

As mentioned above, in this exemplary embodiment, when the noise suppressing apparatus suppresses the impact sound in the noisy signal, it extracts the magnitude component or the power component from the noisy signal and detects the impact sound by using the statistic amount of the time direction change of the magnitude component or the power component. As a result, the noise suppressing apparatus can detect the impact sound more correctly.

Further, in this exemplary embodiment, the impact sound detection unit 10 that is a part of the first exemplary embodiment has been explained. However, the impact sound detection method used for this exemplary embodiment is not limited to the impact sound suppressing method described in the first exemplary embodiment and an arbitrarily method for suppressing the impact sound can be used. Namely, the noise suppressing apparatus may suppress the impact sound by performing a phase process or controlling the magnitude or the power to the impact sound detected by the method of this exemplary embodiment as described in the first exemplary embodiment.

Third Exemplary Embodiment

Figure 6:
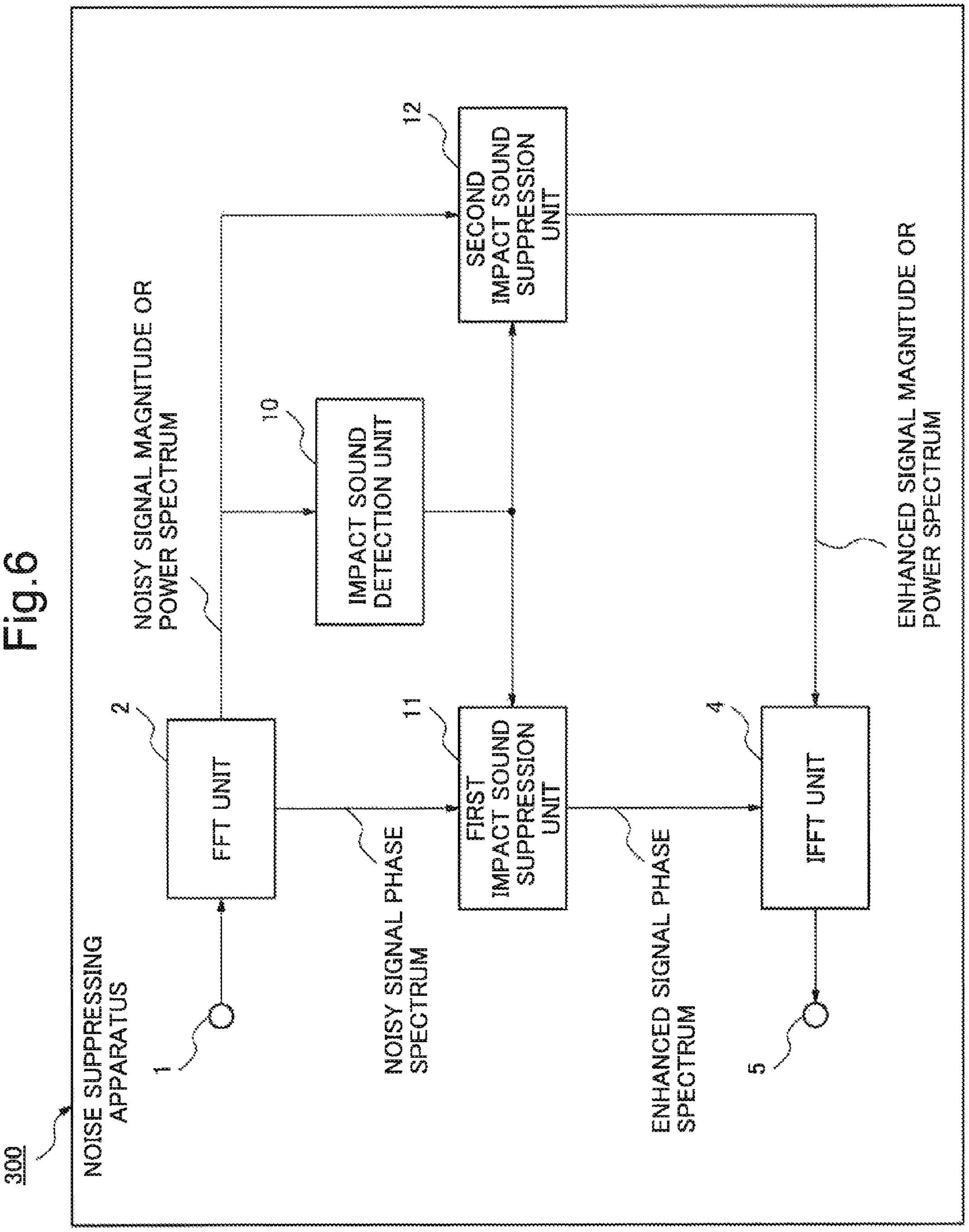
FIG. 6 is a block diagram showing the schematic arrangement of a noise suppressing apparatus 300 according to the third exemplary embodiment of the present invention.

Here, a noise suppressing apparatus according to a third exemplary embodiment of the present invention will be described. FIG. 6 is a figure showing a noise suppressing apparatus 300 according to this exemplary embodiment. The noise suppressing apparatus 300 includes the first impact sound suppression unit 11 and the second impact sound suppression unit 12. The noisy signal magnitude spectrum $|Y_n(k)|$ is supplied from the FFT unit 2 to the impact sound detection unit 10 and the second impact sound suppression unit 12. The average value of the enhanced signal phase spectrum arg $\overline{X}_n(k)$ is supplied from the first impact sound suppression unit to the IFFT unit 4 and the average value of the enhanced signal magnitude spectrum $|\overline{X}_n(k)|$ is supplied from the second impact sound suppression unit 12 to the IFFT unit 4. Because the arrangement of the first impact sound suppression unit 11 is the same as that of the impact sound suppression unit described in the first exemplary embodiment, the detailed description will be omitted here.

Figure 7:
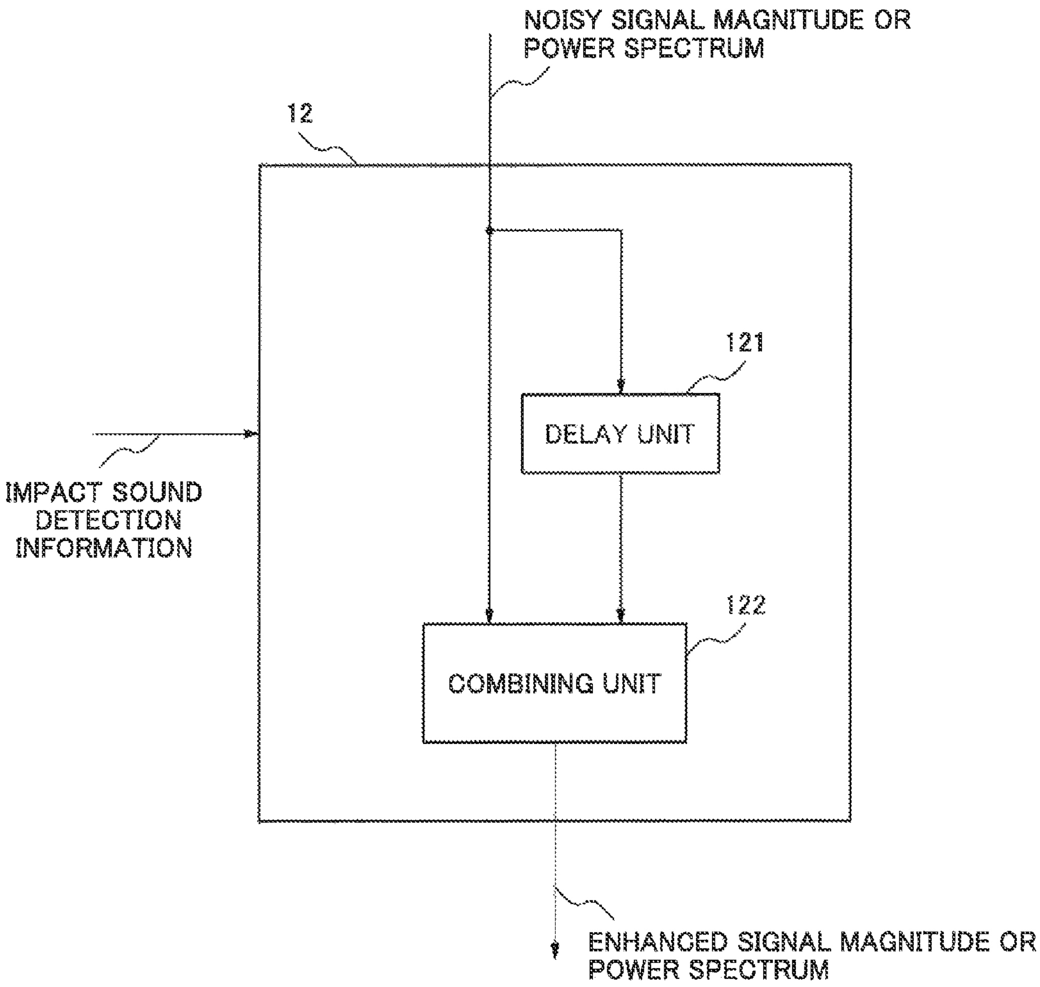
FIG. 7 is a block diagram showing the arrangement of an impact sound suppression unit 12 included in the noise suppressing apparatus 300 according to the third exemplary embodiment of the present invention.

FIG. 7 is a block diagram showing an internal arrangement of the second impact sound suppression unit 12. As shown in FIG. 7, the second impact sound suppression unit 12 includes a delay unit 121 and a combining unit 122. The delay unit 121 delays the noisy signal magnitude spectrum that is an input. It is not necessarily to use one delay amount. The delay unit 121 may have a plurality of delay amounts to generate a plurality of delayed signals. The combining unit 122 combines the inputted noisy signal magnitude spectrum and the delayed noisy signal magnitude spectrum supplied by the delay unit 121 to generate an enhanced signal magnitude spectrum. The combining unit 122 performs a process for combining with the delayed signal only when the impact sound is detected by the impact sound detection unit 10.

The combining unit 122 can apply a process indicated by the following equation (14) like a case in which in the first exemplary embodiment, the process indicated by the equation (8) that uses the past value is applied as the combining process.

$$|\overline{X}_n(k)| = \frac{1}{NM}\sum_{l=n}^{n-M+1}\sum_{p=k-N/2}^{k+N/2} c_{lp}|Y_l(p)| \tag{14}$$

In equation (14), "$c_{1p}$" is a coefficient to the noisy signal magnitude spectrum delayed by 1 frames whose frequency is p. Namely, the combining unit 112 calculates the enhanced signal magnitude spectrum by the linear coupling of the noisy signal magnitude spectrums in a frequency range from k−N/2 to k+N/2 and in a range of frame number from n to n−M+1. The simplest example is an average of the present sample and the sample that is one frame before at each frequency. By using the average, because the difference from the past sample becomes small compared to a case in which only the present sample is used, it becomes hardly perceptible as the impact sound.

As another example of the combining, the combining unit 122 may impose a restriction on the present sample in which a value (for example, the average value or the maximum value) obtained from the past sample is used as an upper limit. When this combining method is used, because the difference from the past sample becomes small compared to a case in which only the present sample is used, it becomes hardly perceptible as the impact sound. Further, the second impact sound suppression unit 12 delays the whole signal like a process to a phase and suppresses the change in magnitude spectrum by using the magnitude spectrum of a component of a future signal that follows the impact sound like the magnitude spectrum of the component of the past signal. Whereby, the impact sound suppression effect can be improved. Further, in the combining of these spectrums, the noisy signal power spectrum can be used instead of the noisy signal magnitude spectrum as described in the above explanation.

As described above, in this exemplary embodiment, a process is performed by using a noisy signal other than the impact sound in the noisy signal so that the magnitude or the power component of the detected impact sound is reduced. Thus, by processing the impact sound with respect to both the phase and the magnitude or the power, the noise suppressing apparatus 300 can more effectively suppress the impact sound.

Fourth Exemplary Embodiment

Figure 8:
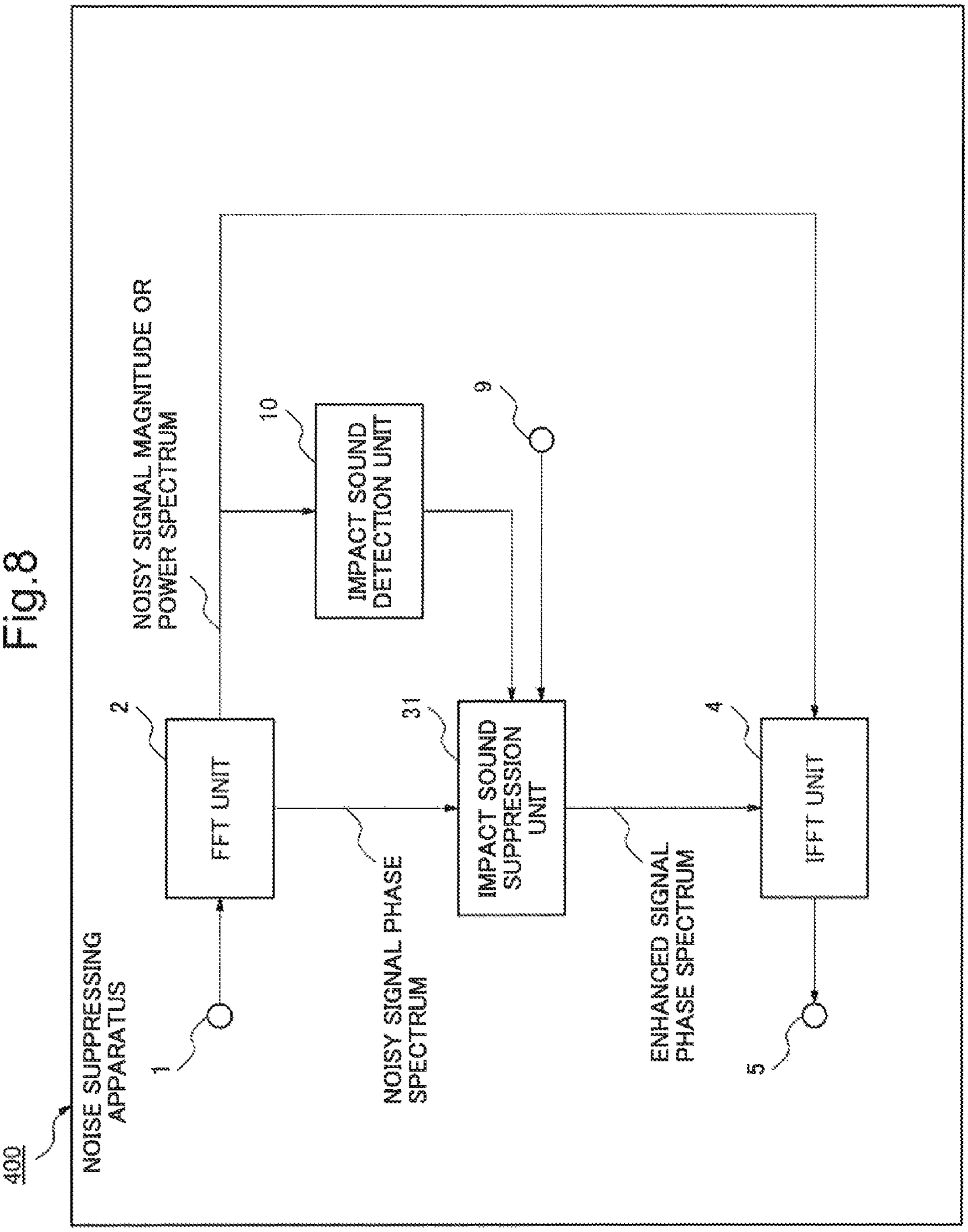
FIG. 8 is a block diagram showing the schematic arrangement of a noise suppressing apparatus 400 according to the fourth exemplary embodiment of the present invention.

Next, a noise suppressing apparatus 400 according to a fourth exemplary embodiment of the present invention will be described by using FIG. 8. The noise suppressing apparatus 400 of this exemplary embodiment has an input terminal 9 to which noise existence information is inputted in addition to the noise suppressing apparatus 100 of the first exemplary embodiment. An impact sound suppression unit 31 shown in FIG. 8 suppresses the impact sound by performing the phase process described in the first exemplary embodiment at each frequency by using the noise existence information supplied from the input terminal 9. The impact sound suppression unit 31 transmits the impact sound suppression result to the IFFT unit 4 as the enhanced signal spectrum. When the noise existence information indicates the existence of noise, the enhanced signal phase spectrum becomes a spectrum in which the impact sound is suppressed by performing the phase process explained in the first exemplary embodiment to the noisy signal phase spectrum. On the other hand, when the noise existence information indicates the non-existence of noise, it becomes the noisy signal phase spectrum itself.

As a result, the impact sound suppression can be performed more efficiently.

Fifth Exemplary Embodiment

Next, a noise suppressing apparatus according to a fifth exemplary embodiment of the present invention will be described. A noise suppressing apparatus according to this exemplary embodiment is configured based on the noise suppressing apparatus according to the third exemplary embodiment described by using FIG. 6 and the internal arrangement of the second impact sound suppression unit 12 of this exemplary embodiment is different from that of the third exemplary embodiment. The arrangement excluding the internal arrangement of the second impact sound suppression unit 12 and the operation are the same as those of the third exemplary embodiment. Therefore, the detailed description will be omitted here.

Figure 9:
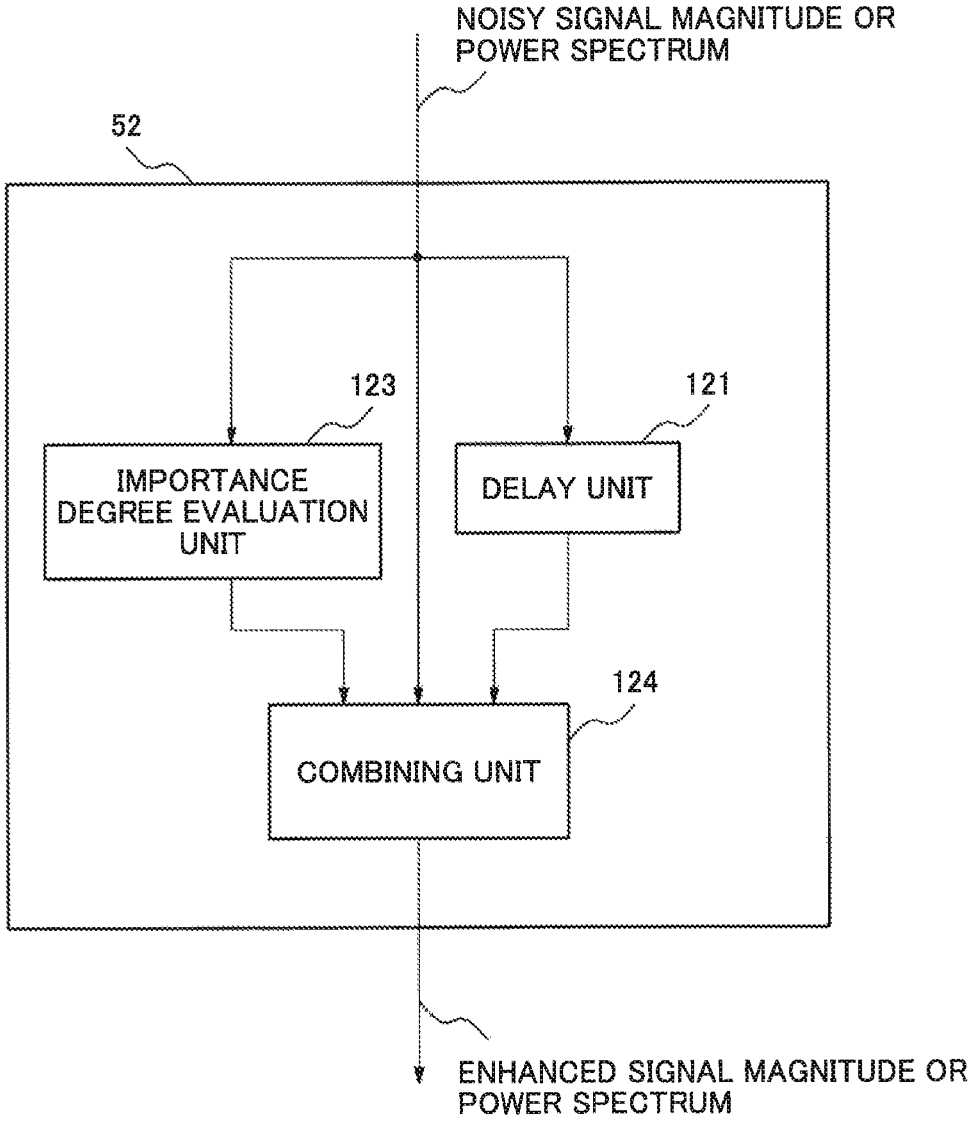
FIG. 9 is a block diagram showing the arrangement of an impact sound suppression unit 52 included in the noise suppressing apparatus according to the fifth exemplary embodiment of the present invention.

An internal arrangement of a second impact sound suppression unit 52 according to this exemplary embodiment is shown in FIG. 9. FIG. 9 is a block diagram showing an arrangement of the impact sound suppression unit 52. As shown in FIG. 9, the second impact sound suppression unit 52 includes an importance degree evaluation unit 123 in addition to the delay unit 121 and a combining unit 124. Because the arrangement of the delay unit 121 has been explained in the third exemplary embodiment by using FIG. 7, the description thereof will be omitted here.

The importance degree evaluation unit 123 generates information (importance degree information) for executing a process according to the importance degree and supplies it to the combining unit 124. The combining unit 124 performs the process according to the importance degree based on the importance degree information supplied by the importance degree evaluation unit 123 in addition to an enhanced signal spectrum combining process.

A first example of the importance degree information generated by the importance degree evaluation unit 123 is a peak of the noisy signal magnitude spectrum. The importance degree evaluation unit 123 can detect a peak of the spectrum by comparing the spectrum at each frequency point with the spectrum at an adjacent frequency point and evaluating whether the difference between them is sufficiently large. In the simplest example, a comparison between the spectrum at each frequency point and the spectrum at each of two adjacent sides (a lower side and a higher side) is performed and when the difference between them is greater than a threshold value, it is determined as the peak. It is not necessarily to use the same threshold value for the comparisons on both sides. It is described in Japanese Industrial Standards JIS x 4332-3 "Coding of Acoustic Video Object—third part Acousmato—" March, 2002 that when the difference threshold value on higher side is smaller than the difference threshold value on lower side, good matching with an aural characteristic can be obtained. Similarly, the importance degree evaluation unit 123 can detect the peak by obtaining the differences at a plurality of frequency points on the lower and higher side and integrating the obtained information. Namely, when a frequency point at which the difference between the spectrum at the frequency point and the spectrum at the just adjacent frequency point is large but the difference between the spectrums at two adjacent frequency points that are located far from the just adjacent frequency point is small is detected, it is determined as the peak. The importance degree evaluation unit 123 supplies the position (frequency) and the magnitude (importance degree) of the peak detected by such method to the combining unit 124.

A second example of the importance degree information generated by the importance degree evaluation unit 123 is magnitude of the noisy signal magnitude spectrum. Even when there is no spectrum peak, the importance degree evaluation unit 123 detects the frequency as a large magnitude when the value is large. For example, when the spectrums having a large value continuously exist in a frequency direction, these spectrums are not detected as the peak. However, such part affects acoustic sense. Accordingly, the importance degree evaluation unit 123 supplies the position (frequency) and the magnitude (importance degree) of the detected large magnitude to the combining unit 124.

A third example of the importance degree information generated by the importance degree evaluation unit 123 is a degree of similarity to noise of the noisy signal magnitude spectrum. There is a low possibility that the peak existing especially, on a lower side among the peaks detected by the peak detection is determined as the noise. The degree of similarity to noise is high at a position at which the spectrum value is small and it is not the peak. Namely, the peak has a low degree of similarity to noise and the non-peak whose spectrum value is small has a high degree of similarity to noise. The importance degree evaluation unit 123 supplies the position (frequency) and the magnitude (importance degree) of these peaks to the combining unit 124.

The importance degree information generated by the importance degree evaluation unit 123 may be created by appropriately combining the peak, the large magnitude, and the degree of similarity to noise that have been explained. For example, a control is performed so that the low threshold value is used for the peak detection of the spectrum having large magnitude and a small peak is detected in a band in which the magnitude thereof is large. This is one of examples. The importance degree evaluation unit 123 can obtain the more correct importance degree information by combining the indexes and using it. As explained above, the importance degree evaluation unit 123 can apply the subband process or the like in which the process is limited in a specific frequency band.

Specifically, the combining unit 124 performs the enhanced signal spectrum combining process that is the same as the process performed by the combining unit 122 explained by using FIG. 7 at a frequency point other than the frequency point supplied by the importance degree evaluation unit 123. The important signal component exists at the frequency point supplied by the importance degree evaluation unit 123 and these play an important role for sound quality of the enhanced signal. Accordingly, the impact sound suppression unit 52 applies the suppression according to the importance degree at these frequency points. In other words, when the importance degree is high, the impact sound suppression unit 52 applies the weak suppression and when the importance degree is low, it applies the strong suppression.

As mentioned above, by using this exemplary embodiment, the suppression in which the importance degree is taken into consideration can be performed to the magnitude or the power spectrum of noise and a higher quality output can be obtained.

Sixth Exemplary Embodiment

Next, a noise suppressing apparatus according to a sixth exemplary embodiment of the present invention will be described. A noise suppressing apparatus according to this exemplary embodiment is configured based on the noise suppressing apparatus according to the third exemplary embodiment explained by using FIG. 6 and the internal arrangement of the second impact sound suppression unit 12 of this exemplary embodiment is different from that of the third exemplary embodiment. The arrangement excluding the internal arrangement of the second impact sound suppression unit 12 and the operation are the same as those of the third exemplary embodiment. Therefore, the detailed description will be omitted here.

Figure 10A:
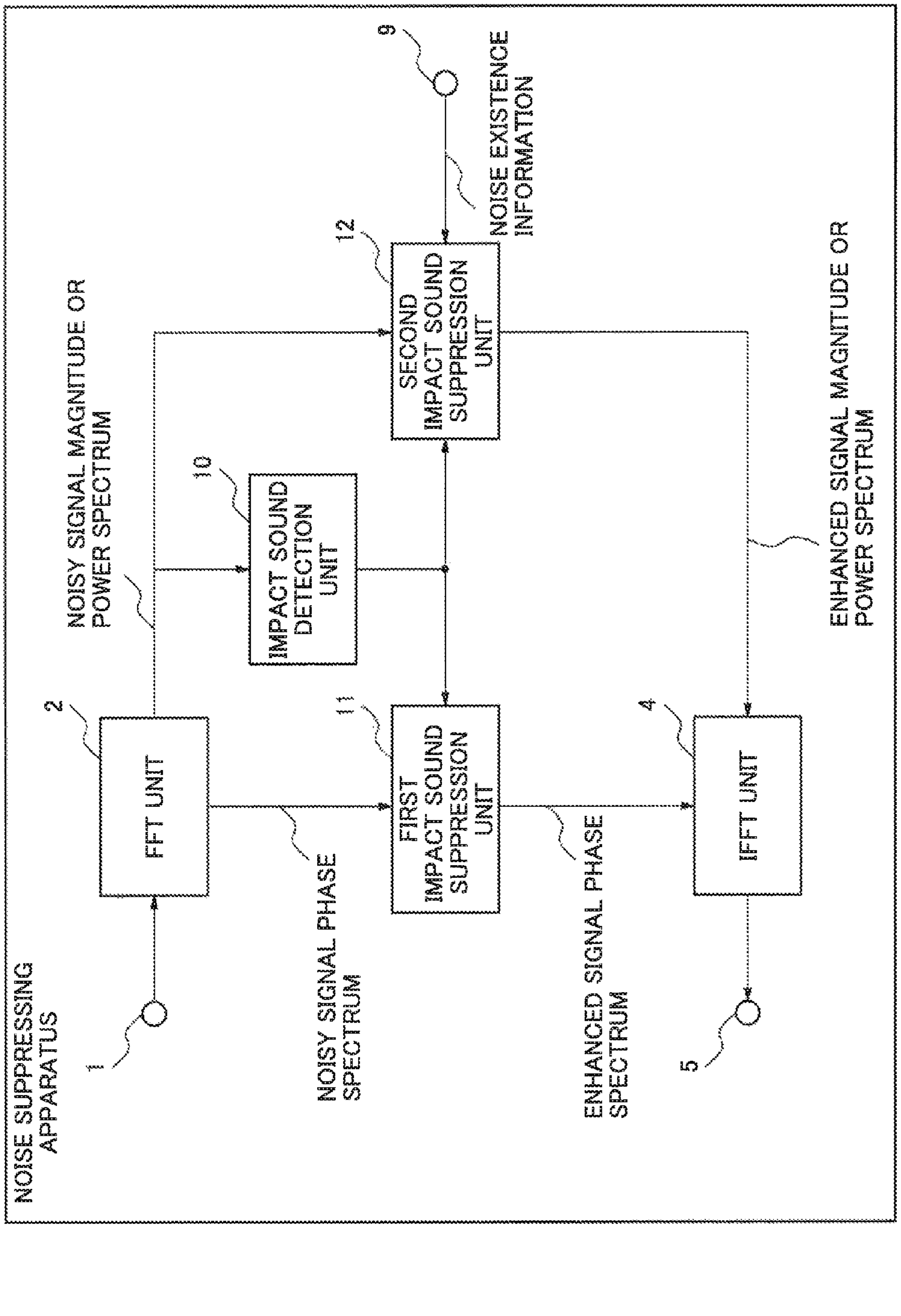
FIG. 10A is a block diagram showing the schematic arrangement of the noise suppressing apparatus according to the sixth exemplary embodiment of the present invention.

FIG. 10A is an entire block diagram of the noise suppressing apparatus according to this exemplary embodiment. This arrangement is similar to the arrangement shown in FIG. 6. However, the noise existence information is supplied to the second impact sound suppression unit 62 from the input terminal 9. This is a difference between them. The arrangement excluding this difference point and the operation are the same as those of the third exemplary embodiment. Therefore, the detailed description will be omitted here.

Figure 10B:
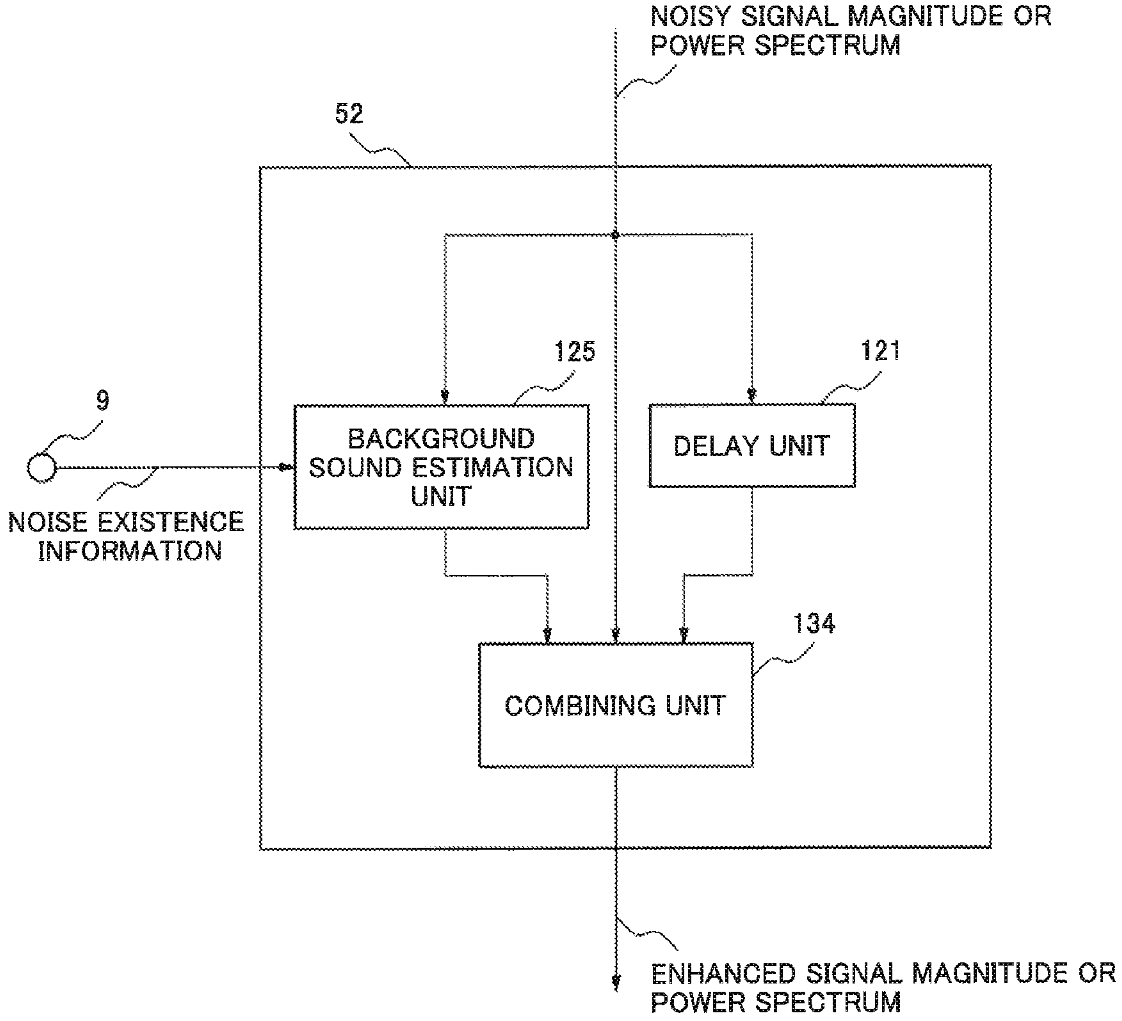
FIG. 10B is a block diagram showing the arrangement of an impact sound suppression unit 62 included in the noise suppressing apparatus according to the sixth exemplary embodiment of the present invention.

FIG. 10B is a block diagram showing the internal arrangement of the second impact sound suppression unit 62. As shown in FIG. 10B, the impact sound suppression unit 62 includes the delay unit 121, a combining unit 134, and a background noise estimation unit 125. The delay unit 121 is the same as the delay unit explained in FIG. 7. Therefore, the explanation thereof will be omitted here. The background noise estimation unit 125 receives the noisy signal magnitude spectrum from the FFT unit 2, receives the noise existence information from the input terminal 9, estimates a background noise level, and supplies it to the combining unit 134 as a background noise level estimate. The background noise estimation unit 125 obtains the background noise level estimate as the estimate of the background noise magnitude spectrum when the noisy signal magnitude spectrum is supplied as the input and as the estimate of the background noise power spectrum when the noisy signal power spectrum is supplied. The background noise estimation unit 125 estimates the background noise only when the noise existence information indicates the existence of the noise and updates the estimate of the background noise. The combining unit 134 performs a different process according to the background noise estimate supplied by the background noise estimation unit 125 in addition to the enhanced signal spectrum combining process that is the same as the process performed in the combining unit 122.

When the noise existence information supplied from the input terminal 9 indicates the existence of the noise, the combining unit 134 performs the suppression in which the background noise estimate supplied by the background noise estimation unit 125 is used as a lower limit. Namely, when the result of the combining is smaller than the background noise estimate, the combining unit 134 makes the suppression weak so as to be equal to the background noise estimate and outputs it as the enhanced signal spectrum. When the result of the combining is equal to or greater than the background noise estimate, the combining unit 134 outputs the result of the combining as the enhanced signal spectrum without changing it. When the noise existence information supplied from the input terminal 9 indicates non-existence of the noise, the combining unit 134 does not perform the process in which the background noise estimate is used as the lower limit and outputs the result of the combining as the enhanced signal spectrum without changing it.

As described above, the impact sound suppression unit 62 performs the suppression in which the background noise estimate is used as the lower limit and whereby, excessive suppression can be avoided and the enhanced signal which gives a natural auditory sensation can be obtained.

Seventh Exemplary Embodiment

Next, a noise suppressing apparatus according to a seventh exemplary embodiment of the present invention will be described by using FIG. 11. A noise suppressing apparatus according to this exemplary embodiment is configured based on the noise suppressing apparatus according to the third exemplary embodiment explained by using FIG. 6 and the internal arrangement of the second impact sound suppression unit 72 of this exemplary embodiment is different from that of the third exemplary embodiment. The arrangement excluding the internal arrangement of the second impact sound suppression unit 72 and the operation are the same as those of the third exemplary embodiment. Therefore, the detailed description will be omitted here.

Figure 11:
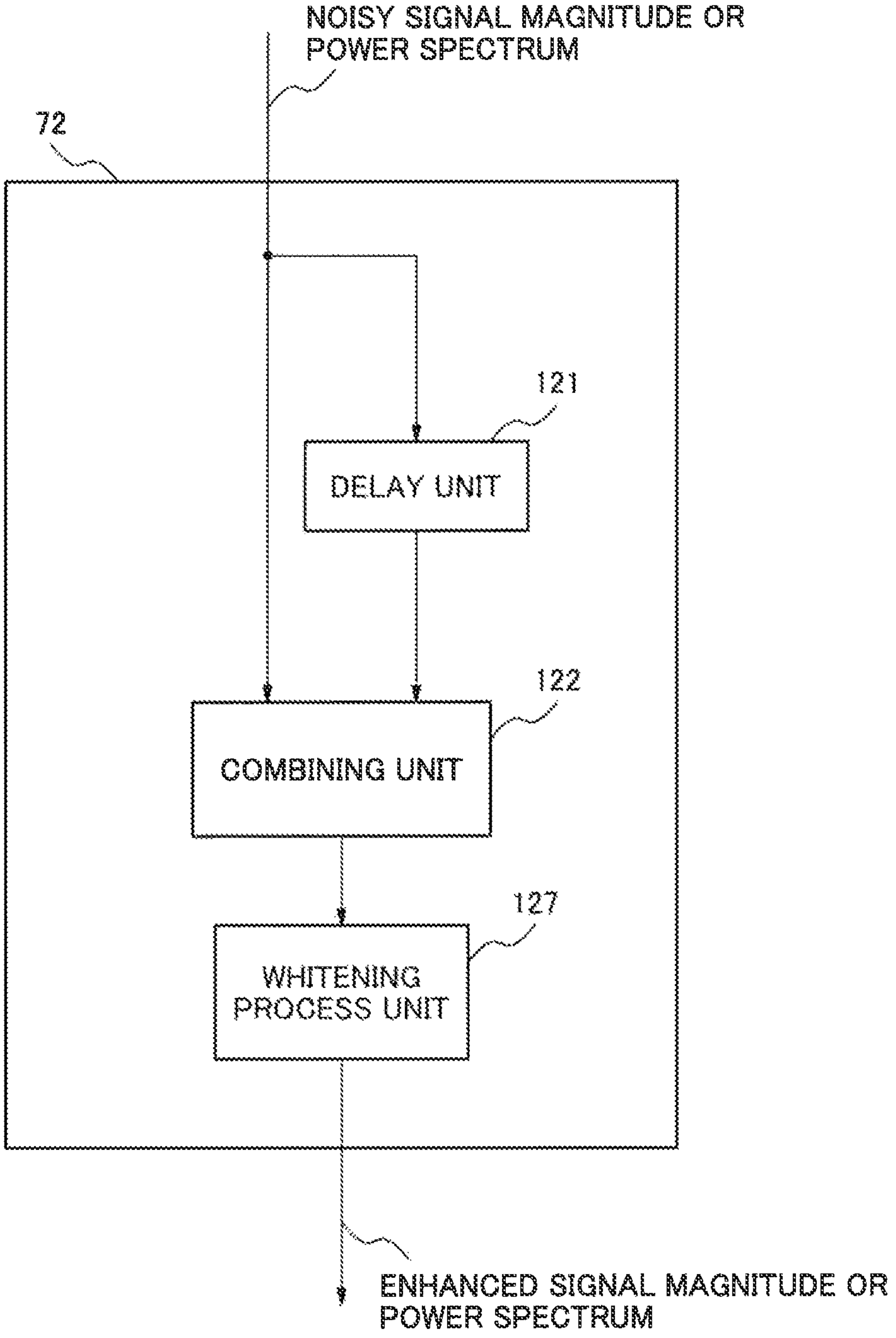
FIG. 11 is a block diagram showing the arrangement of an impact sound suppression unit 72 included in the noise suppressing apparatus according to the seventh exemplary embodiment of the present invention.

FIG. 11 is a block diagram showing an internal arrangement of the second impact sound suppression unit 72. As shown in FIG. 11, the second impact sound suppression unit 72 includes the delay unit 121, the combining unit 122, and a whitening process unit 127. The relationship between the delay unit 121 and the combining unit 122 has been explained in FIGS. 5 to 7. Therefore, the description will be omitted here. The whitening process unit 127 receives the enhanced signal spectrum from the combining unit 122, whitens it, and outputs it as a whitened enhanced signal spectrum.

The whitening process unit 127 calculates an average value of the enhanced signal magnitude spectrum and makes variance from this average value less than or equal to a reference value. Specifically, the whitening process unit 127 replaces the magnitude spectrum value exceeding an average value+ϵ with the average value+ϵ. Further, the whitening process unit 127 replaces the magnitude spectrum value smaller than an average value−ϵ with the average value−ϵ. The whitening process unit 127 does not change the magnitude spectrum value of the enhanced signal magnitude spectrum other than the above-mentioned enhanced signal magnitude spectrum. The whitening process unit 127 may perform the replacement with a random number in a range of the average values+−ϵ instead of the replacement with the average values+−ϵ. For example, the whitening process unit 127 replaces the magnitude spectrum value exceeding the average value+ϵ with a random number in a range from the average value+ϵ to the average value. Further, the whitening process unit 127 replaces the magnitude spectrum value smaller than the average value−ϵ with a random number in a range from the average value−ϵ to the average value. The magnitude spectrum value is equalized by the whitening process and whereby, the noise becomes hardly perceptible.

Further, the importance degree evaluation unit 123 explained by using FIG. 9 may be used in addition to the arrangement shown in FIG. 11. In the case, the whitening process unit 127 can use the output of the importance degree evaluation unit 123 for the whitening process. The importance degree evaluation unit 123 obtains the degree of similarity to noise and only when the degree of similarity to noise is high, the whitening process unit 127 performs the whitening process. By this means, when there are few desired signal components, the enhanced signal becomes similar to a white signal and whereby, it becomes hardly perceptible as noise.

The whitening process unit 127 can individually perform the process in the plurality of subbands in these whitening processes. It is possible not to perform the whitening process in a specific subband that is performed by the whitening process unit 127. In this case, because the whitening process unit 127 uses the different average values for each subband, the enhanced signal which gives a natural auditory sensation can be obtained.

Eighth Exemplary Embodiment

Figure 12:
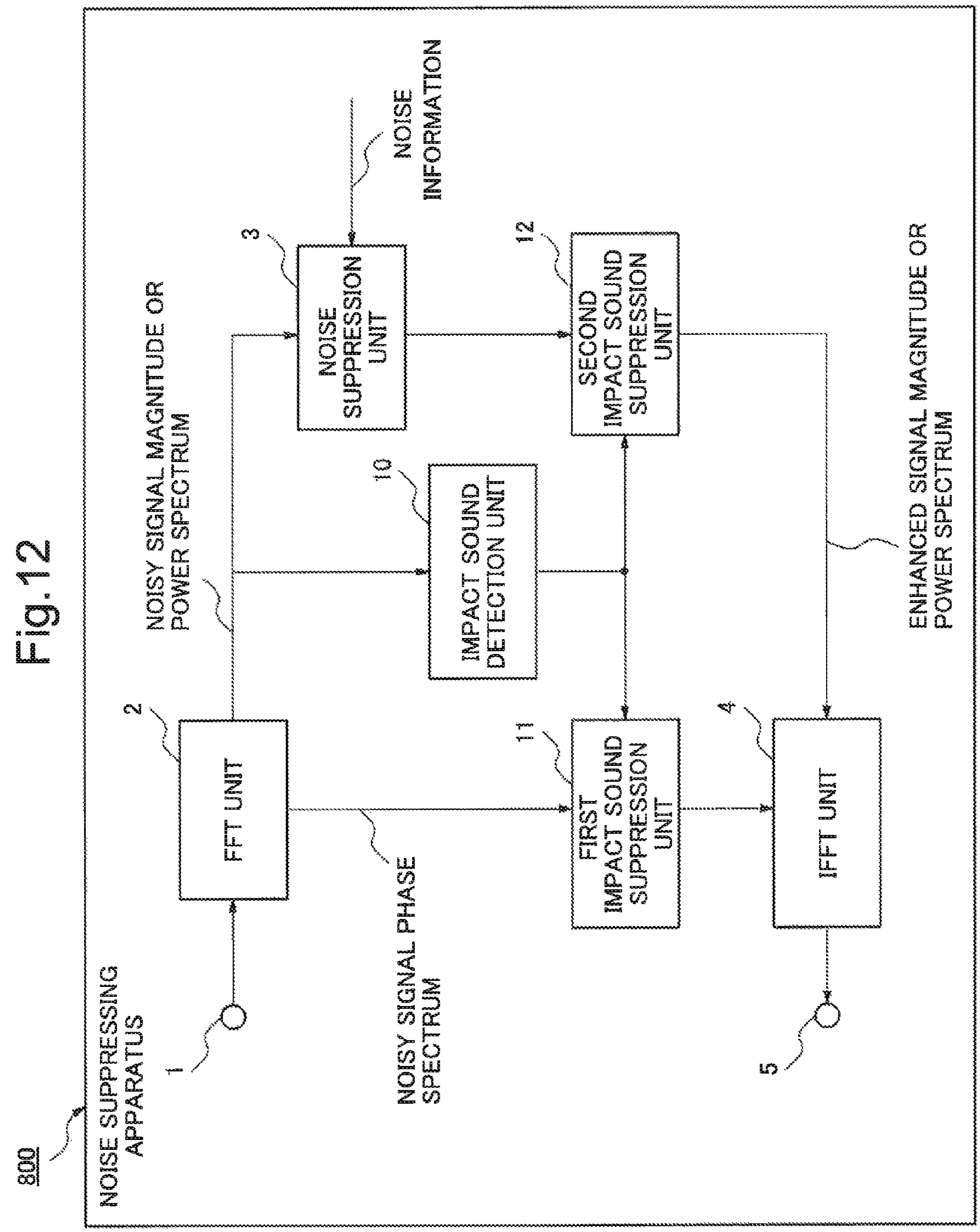
FIG. 12 is a block diagram showing the schematic arrangement of a noise suppressing apparatus 800 according to the eighth exemplary embodiment of the present invention.

FIG. 12 is a block diagram showing an arrangement of a noise suppressing apparatus according to an eighth exemplary embodiment of the present invention. In this exemplary embodiment, a noise suppression unit 3 is used. This is a difference between this exemplary embodiment and the first exemplary embodiment. Accordingly, the same reference numbers are used for the units having the same function as the above-mentioned exemplary embodiment and explanation of the units is omitted.

The noise suppression unit 3 suppresses the noise at each frequency by using the noisy signal magnitude spectrum supplied by the FFT unit 2 and the inputted noise information (information about the noise supplied from the outside) and transmits the enhanced signal magnitude spectrum that is the noise suppression result to the IFFT unit 4.

By using the above-mentioned arrangement, the noise suppressing apparatus can adequately suppress the noise other than the impact sound.

Ninth Exemplary Embodiment

Figure 13:
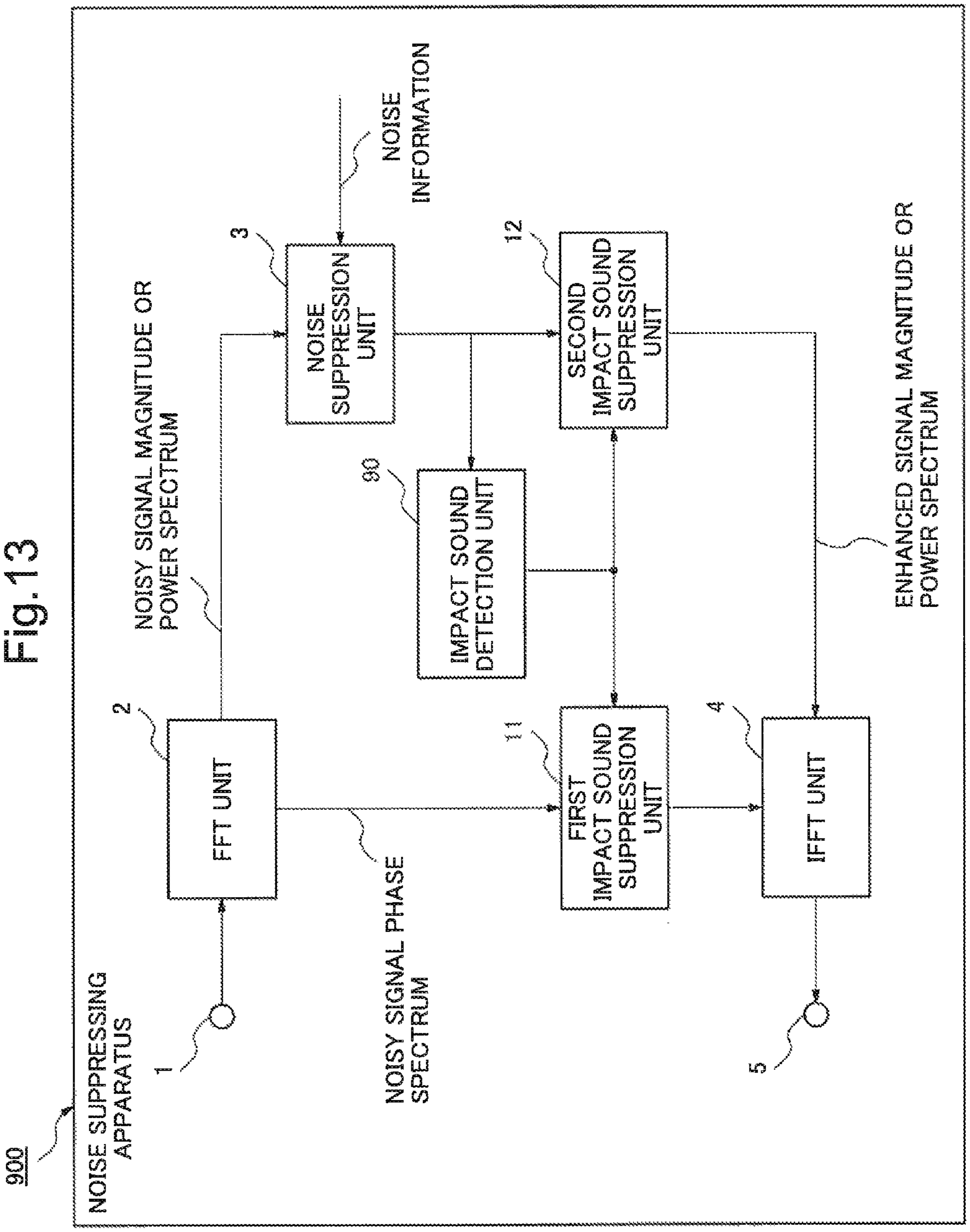
FIG. 13 is a block diagram showing the schematic arrangement of a noise suppressing apparatus 900 according to the ninth exemplary embodiment of the present invention.

FIG. 13 is a block diagram showing an arrangement of a noise suppressing apparatus according to a ninth exemplary embodiment of the present invention. In this exemplary embodiment, an impact sound detection unit 90 detects the impact sound by using a result in which noise is suppressed by the noise suppression unit 3. This is a difference between this exemplary embodiment and the eighth exemplary embodiment. The arrangements of the other units of this exemplary embodiment are the same as those of the eighth exemplary embodiment. Therefore, the same reference numbers are used for the units having the same function as the above-mentioned exemplary embodiment and explanation of these units is omitted.

The output of the noise suppression unit 3 is inputted to the impact sound detection unit 90. Because the arrangement of the impact sound detection unit 90 is the same as that of the impact sound detection unit 10 explained in the first exemplary embodiment, the detailed description will be omitted here.

By using the above-mentioned arrangement, the impact sound detection unit 90 can more correctly detect the impact sound by using the result in which noise is suppressed by the noise suppression unit 3.

Tenth Exemplary Embodiment

Figure 14:
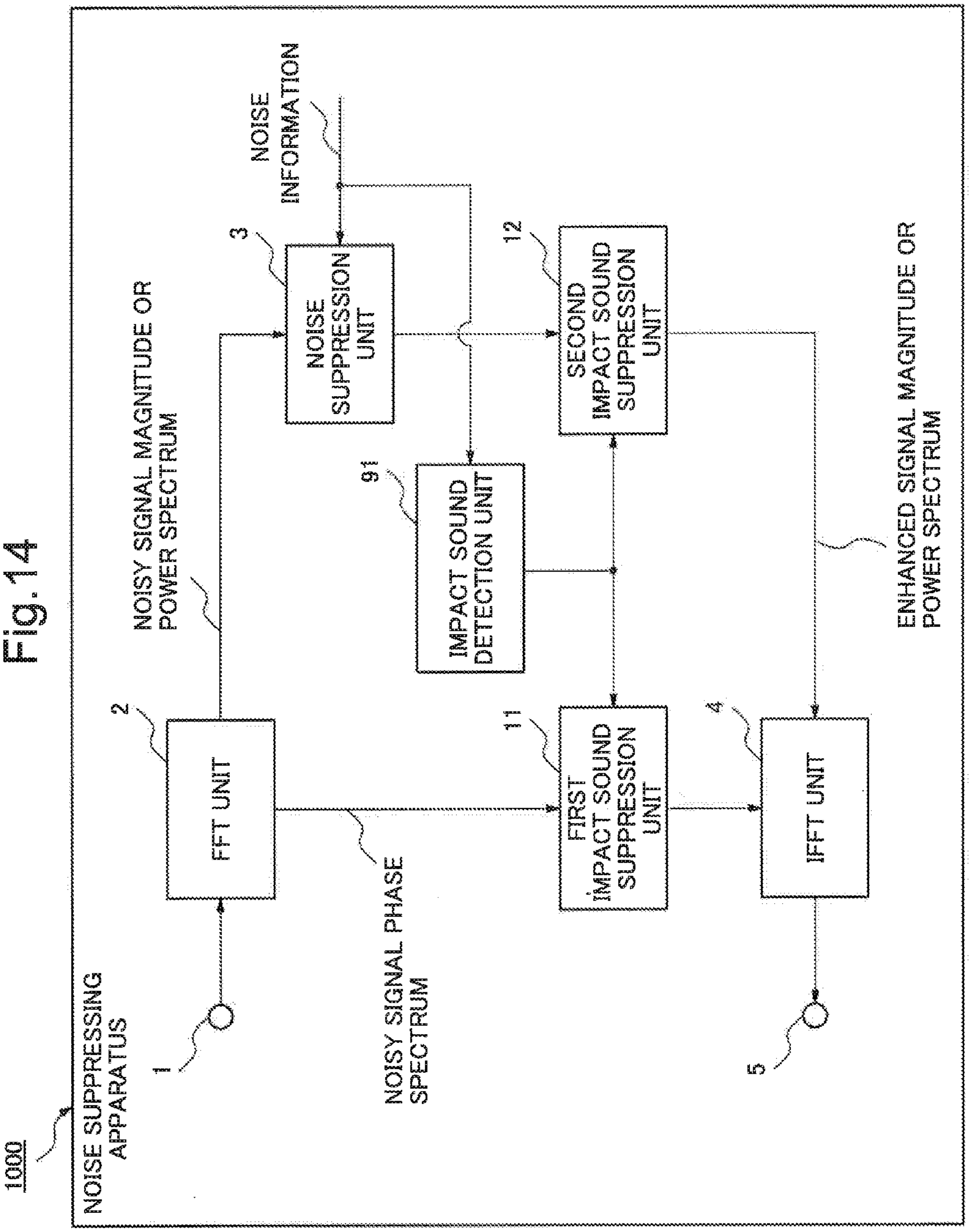
FIG. 14 is a block diagram showing the schematic arrangement of a noise suppressing apparatus 1000 according to the tenth exemplary embodiment of the present invention.

FIG. 14 is a block diagram showing an arrangement of a noise suppressing apparatus according to a tenth exemplary embodiment of the present invention. In this exemplary embodiment, an impact sound detection unit 91 detects the impact sound by using noise information. This is a difference between this exemplary embodiment and the eighth exemplary embodiment. The impact sound detection unit 91 detects the impact sound by using the supplied noise information (for example, noise information including information indicating the existence of noise (noise existence information) and information about a spectral shape or the like). The arrangements of the other units of this exemplary embodiment are the same as those of the eighth exemplary embodiment. Therefore, the same reference numbers are used for the units having the same function as the above-mentioned exemplary embodiment and explanation of these units is omitted.

When the noise information indicates the existence of noise, the impact sound detection unit 91 detects the impact sound by using the noisy signal magnitude spectrum supplied by the FFT unit 2 and the inputted noise information.

By using the above-mentioned arrangement, the noise suppressing apparatus can correctly detect the impact sound and suppress this.

Other Exemplary Embodiment

The first to tenth exemplary embodiments have been described above concerning noise suppressing apparatuses having different characteristic features. Exemplary embodiments also incorporate noise suppressing apparatuses formed by combining the characteristic features in whatever way.

The present invention may be applied to a system including a plurality of devices or a single apparatus. The present invention is also applicable when the signal processing program of software for implementing the functions of the exemplary embodiments to the system or apparatus directly or from a remote site. Hence, the present invention also incorporates a program that is installed in a computer to cause the computer to implement the functions of the present invention, a medium that stores the program, and a WWW server from which the program is downloaded.

Figure 15:
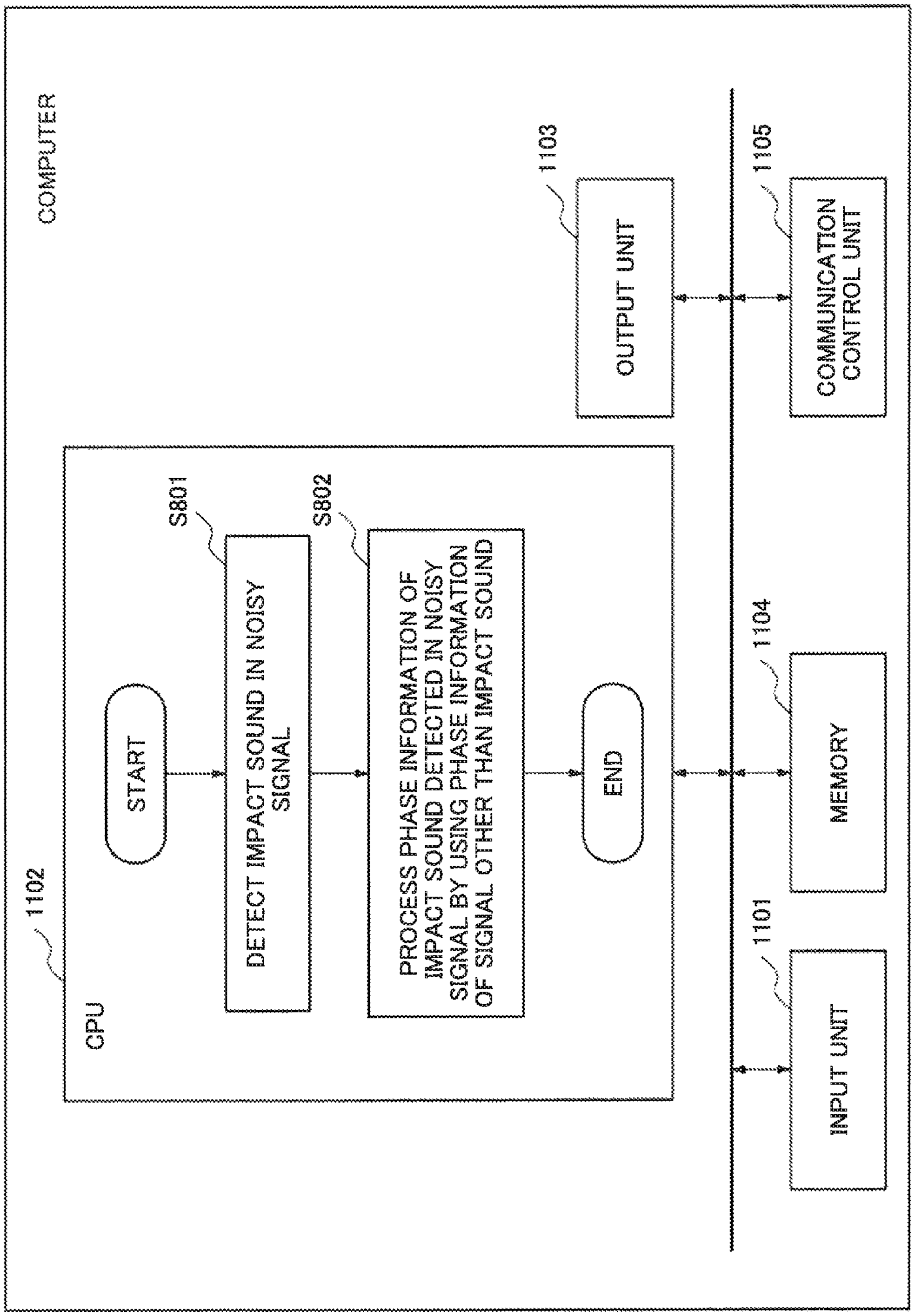
FIG. 15 is a schematic arrangement diagram of a computer 1100 which executes a signal processing program according to another exemplary embodiment of the present invention.

FIG. 15 is a block diagram of a computer 1100 that executes a signal processing program configured as the first to tenth exemplary embodiments. The computer 1100 includes an input unit 1101, a CPU 1102, an output unit 1103, a memory 1104, and a communication control unit 1106.

A CPU 1102 controls operation of the computer 1100 by reading a signal processing program. Namely, the CPU 1102 which executes the signal processing program detects the impact sound in the noisy signal (S801). Next, the CPU 1102 processes phase information of the impact sound detected in the noisy signal by using the phase information of a noisy signal other than the impact sound (S802).

This makes it possible to obtain the same effects as in the first exemplary embodiments.

While the present invention has been described above with reference to exemplary embodiments, the invention is not limited to the exemplary embodiments. The arrangement and details of the present invention can variously be modified without departing from the spirit and scope thereof, as will be understood by those skilled in the art.

The invention claimed is:

1. A signal processing method for suppressing an impact sound in a noisy signal that contains the impact sound and other signal components, the method comprising:

detecting the impact sound in the noisy signal; and processing phase information of the detected impact sound by using phase information of the signal components in the noisy signal so that a change in the phase information of the detected impact sound is reduced.

2. The signal processing method of claim 1, wherein the phase information of the impact sound is processed by using the phase information of the noisy signal before the occurrence of the impact sound in the noisy signal.

3. The signal processing method of claim 2, wherein the phase information of the impact sound is replaced with the phase information of the noisy signal before the occurrence of the impact sound in the noisy signal.

4. The signal processing method of claim 2, wherein the phase information of the impact sound is replaced with an average value between the phase information of the noisy signal before the occurrence of the impact sound in the noisy signal and the phase information of the impact sound.

5. The signal processing method of claim 2, wherein the noisy signal is delayed and the phase information of the impact sound is processed by using the phase information of the noisy signal before the occurrence of the impact sound in the noisy signal.

6. The signal processing method of claim 1, wherein the noisy signal is separated into the phase information and magnitude or power information, and the impact sound in the noisy signal is detected by using the magnitude or power information.

7. The signal processing method of claim 6, wherein a process is performed by using the magnitude or power information of the noisy signal other than the impact sound in the noisy signal so as to make the magnitude or power information of the detected impact sound small.

8. The signal processing method of claim 7, wherein the magnitude or power information of the detected impact sound is coupled with the magnitude or power information of the noisy signal before the occurrence of the impact sound in the noisy signal.

9. The signal processing method of claim 8, wherein the noisy signal is delayed and the magnitude or power information of the impact sound is processed by using the magnitude or power information of the noisy signal before and after the occurrence of the impact sound in the noisy signal.

10. The signal processing method of claim 7, wherein the magnitude or power information of the detected impact sound is averaged by using the magnitude or power information of the noisy signal before the occurrence of the impact sound in the noisy signal.

11. The signal processing method of claim 6, wherein the magnitude or power information of the detected impact sound is limited by using the magnitude or power information of the noisy signal before the occurrence of the impact sound in the noisy signal.

12. The signal processing method of claim 6, wherein an average value of the magnitude or power information is obtained and the variance of the magnitude or power information from the average value is made less than or equal to a reference value.

13. The signal processing method of claim 6, wherein noise in the magnitude or power information is suppressed by using noise information and the impact sound is detected by using the result.

14. The signal processing method of claim 6, wherein noise in the magnitude or power information is suppressed by using noise information, and the impact sound is detected by using the noise information.

15. The signal processing method of claim 1, wherein noise existence information is inputted and the impact sound is suppressed when the noise existence information indicates the existence of noise.

16. The signal processing method of claim 1, wherein an importance degree in the noisy signal is evaluated, and the impact sound is weakly suppressed at a part having a high importance degree in the noisy signal and strongly suppressed at a low importance degree.

17. The signal processing method of claim 1, wherein a background noise in the noisy signal is estimated, and the background noise estimate in the noisy signal is set as a lower limit for the impact sound suppression.

18. An information processing apparatus which suppresses an impact sound in a noisy signal that contains the impact sound and other signal components, the apparatus comprising:

a detection unit which detects the impact sound in the noisy signal and a phase processing unit which processes phase information of the detected impact sound by using phase information of the signal components in the noisy signal so that a change in the phase information of the detected impact sound is reduced.

19. A computer readable non-transitory medium for storing a signal processing program for suppressing an impact sound in a noisy signal that contains the impact sound and other signal components, wherein the signal processing program causes a computer to execute:

detecting the impact sound in the noisy signal and processing phase information of the detected impact sound by using phase information of the signal components in the noisy signal so that a change in the phase information of the detected impact sound is reduced.

20. An information processing apparatus which suppresses an impact sound in a noisy signal that contains the impact sound and other signal components, the apparatus comprising:

detection means for detecting the impact sound in the noisy signal and phase processing means for processing phase information of the detected impact sound by using phase information of the signal components in the noisy signal so that a change in the phase information of the detected impact sound is reduced.

* * * * *